US011066167B2

(12) United States Patent
Bennett

(10) Patent No.: US 11,066,167 B2
(45) Date of Patent: Jul. 20, 2021

(54) METHOD AND APPARATUS USED FOR BIOLOGICAL CONTROL OF AGRICULTURAL PESTS

(71) Applicant: Chandler Bennett, Salinas, CA (US)

(72) Inventor: Chandler Bennett, Salinas, CA (US)

( * ) Notice: Subject to any disclaimer, the term of this patent is extended or adjusted under 35 U.S.C. 154(b) by 335 days.

(21) Appl. No.: 16/074,756

(22) PCT Filed: Dec. 21, 2016

(86) PCT No.: PCT/US2016/068101
§ 371 (c)(1),
(2) Date: Aug. 1, 2018

(87) PCT Pub. No.: WO2017/136063
PCT Pub. Date: Aug. 10, 2017

(65) Prior Publication Data
US 2019/0037828 A1    Feb. 7, 2019

Related U.S. Application Data

(60) Provisional application No. 62/290,345, filed on Feb. 2, 2016.

(51) Int. Cl.
*B64D 1/18* (2006.01)
*A01M 9/00* (2006.01)
*B64C 39/02* (2006.01)

(52) U.S. Cl.
CPC ............ *B64D 1/18* (2013.01); *A01M 9/0061* (2013.01); *B64C 39/024* (2013.01); *B64C 2201/021* (2013.01); *B64C 2201/024* (2013.01); *B64C 2201/104* (2013.01); *B64C 2201/108* (2013.01); *B64C 2201/12* (2013.01); *B64C 2201/141* (2013.01)

(58) Field of Classification Search
CPC ..... B64D 1/18; B64C 2201/12; A01M 9/0061
See application file for complete search history.

(56) References Cited

U.S. PATENT DOCUMENTS

| 3,495,793 | A | | 2/1970 | Barlow | |
|---|---|---|---|---|---|
| 4,453,675 | A | * | 6/1984 | Kodadek | ................. A01M 1/14 239/171 |
| 9,346,546 | B2 | | 5/2016 | Markov | |
| 9,382,003 | B2 | * | 7/2016 | Burema | ................ B64C 39/024 |
| 9,598,172 | B2 | | 3/2017 | Markov | |

(Continued)

*Primary Examiner* — Jessica B Wong
(74) *Attorney, Agent, or Firm* — JRG Attorneys at Law

(57) ABSTRACT

An apparatus for biological control of agricultural pests and for reducing damage to crops. The apparatus includes a container for holding biological organisms or material. The container also includes first and second ends and an opening formed at the first end for receiving the biological organisms. The apparatus has a dispensing port disposed at the second end for dispensing the biological organisms over a target location. The apparatus further includes an auger, driven by a motor and having a plurality of spiral like wire brushes, said auger mounted to and driven by a first motor; a spreader motor mount having a motor mount holding area for holding a second motor, the spreader motor mount having a motor mount connection area for connecting to the second end; and a spreader agitating device used for spreading the biological organisms or material over the target location.

8 Claims, 33 Drawing Sheets

(56) References Cited

U.S. PATENT DOCUMENTS

| | | |
|---|---|---|
| 9,852,644 B2 | 12/2017 | Salnikov et al. |
| 10,377,491 B1 | 8/2019 | Fine et al. |
| 10,569,877 B2 | 2/2020 | Miller |
| 2014/0263764 A1* | 9/2014 | Outcalt ................. E01H 10/007 239/687 |
| 2014/0303814 A1* | 10/2014 | Burema ............... A01B 79/005 701/3 |
| 2015/0122950 A1 | 5/2015 | Markov |
| 2016/0307448 A1 | 10/2016 | Salnikov et al. |
| 2016/0340037 A1 | 11/2016 | Markov |
| 2018/0201372 A1 | 7/2018 | Miller |
| 2019/0071177 A1 | 3/2019 | Zvara |

* cited by examiner

```
                        1400

┌─────────────────────────────────────────────┐
    │ Holding biological organisms or material within a │
    │ container.                                   │
    │                    1410                      │
    └─────────────────────────────────────────────┘
                          │
                          ▼
    ┌─────────────────────────────────────────────┐
    │ Driving an auger having a plurality of spiral like wire │
    │ brushes.                                     │
    │                    1420                      │
    └─────────────────────────────────────────────┘
                          │
                          ▼
    ┌─────────────────────────────────────────────┐
    │ Pushing out the biological organisms or material to a │
    │ dispensing port using a the spiral like wire brushes. │
    │                    1430                      │
    └─────────────────────────────────────────────┘
                          │
                          ▼
    ┌─────────────────────────────────────────────┐
    │ Dispensing the biological organisms or material through │
    │ the dispensing port.                         │
    │                    1440                      │
    └─────────────────────────────────────────────┘
                          │
                          ▼
    ┌─────────────────────────────────────────────┐
    │ Spreading the biological organisms or material over a │
    │ biological target to be treated using a spreader agitating │
    │ device.                                      │
    │                    1450                      │
    └─────────────────────────────────────────────┘
```

FIG. 14

METHOD AND APPARATUS USED FOR BIOLOGICAL CONTROL OF AGRICULTURAL PESTS

PRIORITY CLAIM

This non-provisional application claims priority to Provisional Patent Application Ser. No. 62/290,345, entitled "Method and Apparatus for Biological Control of Agricultural Pests", filed on Feb. 2, 2016.

TECHNICAL FIELD

The present invention relates generally to the field of biological control of agricultural pests, and more specifically without limitation, to a spider mite biological control method and apparatus thereof.

BACKGROUND OF THE INVENTION

Plant pests are a significant factor in the loss of the world's important agricultural crops. Billions of dollars are lost every year in the U.S. and around the world due to infestations of plants by non-mammalian pests including insects. In addition to losses in field crops, insect pests and/or mites are also a burden to vegetable and fruit growers, to producers of ornamental flowers, and to home gardeners. For example, spider mites often attack strawberry fields causing extensive damage to the crop, resulting in significant economic loss to the growers.

Insect pests and/or mites are mainly controlled by intensive applications of chemical pesticides and/or insecticides, which are active through inhibition of insect growth, prevention of insect feeding or reproduction, or cause death. Although the use of such chemicals can result in good control of insect pests, the widespread use of chemical pesticides can result in the appearance of resistant insect varieties. Moreover, high levels of chemicals on horticultural crops are undesirable to many consumers. Further, chemical pesticides can also encourage the spread of the insect pests such as spider mites by killing the beneficial insects that prey on them. Similarly, insect pests or mites are also known to develop quick resistance to various pesticides.

An alternative to using chemical pesticides and/or insecticides is through the application of beneficial insects or mites. The beneficial insects or mites used are advantageously predatory towards pest insects such as two-spotted spider mites, and can be applied to crops to control insect pests. Beneficial insects or mites can be dispersed on crop plants in a variety of ways, for example manually or through a controlled release device.

The use of beneficial insects or mite forms part of integrated crop management and integrated pest management programs, combining cultural, biological and chemical means to achieve sustainable pest control. However, a typical problem currently encountered with the release of beneficial insects, predatory mites or other essentially beneficial biological organisms in agricultural fields is that it can be very labor intensive and inaccurate. For instance, hand application is not precise in placement of hots spots and application amounts can vary significantly over a given area.

The application of biologicals by hand is not only labor intensive but poses other problems which result in a higher cost of application of the biologicals. For example, the high cost comes from not only time and related hourly wages but also from insurance, workman's compensation, and other costs associated with manual labor. In addition, hand application of biologicals requires workers to walk through the growing fields which can introduce the problem of stepping on the crops causing damage thereof. Further, using tractors or the like for application of biologicals over and/or on crops may not be practical or even an option in rainy or muddy conditions which delays important treatment of agricultural pests.

In light of the shortcomings in the prior art, there clearly exists a need for the application of materials and/or biological organisms such as beneficial insects or predatory mites using aerial vehicles, specifically unmanned aerial vehicles for the rapid dispersal of the biological organisms/materials over large or concentrated areas with minimal manual labor.

SUMMARY OF THE INVENTION

The present invention is an apparatus used for biological control and/or eradication of agricultural pests (e.g., prey) by the spreading of essentially beneficial biological organisms and/or materials over a selected target location for reducing damage to crops.

The present invention is also directed to an apparatus and method for dispensing essentially beneficial biological organisms such as predatory mites over a selected biological target or target location such as a strawberry field in order to control and/or to eradicate spider mites (e.g., prey).

It is a feature of the present invention to provide an apparatus for biological control of agricultural pests comprised of a container for containing biological organisms or materials and having a dispensing port; said dispensing port for dispensing the biological organisms or materials on a target location or biological target to be treated; an auger motor mounted within the container; an auger driven by the auger motor and having a plurality of spiral like wire brushes for urging the biological organisms to the dispensing port; a spreader motor disposed within the container and disposed substantially at the dispensing port of the container; and a spreader agitating device driven by the spreader motor for spreading the biological organisms or materials over the target location or biological target to be treated.

It is a further feature of the present invention to provide an autonomous airborne apparatus used for biological control of agricultural pests comprised of a container for containing biological organisms or materials and having a dispensing port; said dispensing port for dispensing the biological organisms or materials on a target location to be treated; and a motor for driving the biological organisms or materials out of the container through the dispensing port.

Another advantageous feature of the invention is to provide a method of biologically controlling agricultural pests, the method comprising the steps of containing biological organisms or materials within a container having a dispensing port; driving an auger having a plurality of spiral like wire brushes for urging the biological organisms or materials to the dispensing port using the spiral like wire brushes; dispensing the biological organisms or materials through the dispensing port; agitating the biological organisms received from the dispensing port; and spreading the agitated biological organisms or materials over a target location or biological target to be treated.

The present invention additionally provides an apparatus to help reduce the need for manual labor when dispensing essentially beneficial biological organisms or materials such as predatory mites over biological targets such as agricultural crops.

The present invention also provides an apparatus for dispersing essentially beneficial biological organisms in a rapid manner over large or concentrated areas with minimal labor and time.

The present invention further provides an apparatus that can advantageously dispense essentially beneficial biological organisms or materials over large or concentrated areas using an unmanned aerial vehicle (UAV) (e.g., multi or single helicopter) such as a drone or a fixed wing UAV. Importantly, the use of UAV's helps to eliminate workers from potentially stepping on the crops and causing damage thereof. Likewise, the use of UAV's helps to advantageously eliminate the need of having to use tractors or similar like vehicles for the application of biologicals especially during rainy or muddy type weather conditions.

Another aspect of the present invention is to provide a low cost, high efficiency apparatus that can optionally use the aid or guidance of a global positioning system (GPS) on the UAV to uniformly apply the essentially beneficial biological organisms or materials over a selected biological target or target location such as strawberry fields or a structure.

A further aspect of the current invention is to provide an apparatus and method that can save agricultural growers a significant amount of money by helping them to control and/or to eliminate damage to their crops from plant pests.

An additional aspect of the present invention is to provide an apparatus and method that can help to reduce the amount of chemical pesticides and/or insecticides used to control and/or to eliminate agricultural pests.

The present invention also provides an apparatus and method for advantageously dispensing predatory mites, predatory insects, essentially beneficial biological organisms or beneficial biological materials over a selected biological target that is less harmful to humans.

Another feature of the invention is to provide an apparatus and method for advantageously dispensing various materials such as seeds, herbicides, pesticides, fungicides, fertilizers over a selected target or target location.

Consequently, for a better understanding of the present invention, its functional advantages and the specific objects attained by its uses, reference should be made to the accompanying drawings, claims and descriptive matter in which there are illustrated preferred embodiments of the invention.

BRIEF DESCRIPTION OF THE DRAWINGS

FIG. 14 represents an execution diagram for the method of biological controlling agricultural pests.

DETAILED DESCRIPTION OF THE INVENTION

The following detailed description is of the best currently contemplated modes of carrying out various embodiments of the invention. The description is not to be taken in a limiting sense, but is made for at least the purpose of illustrating the general principles of the invention, since the scope of the invention is best defined by the appended claims.

Figure 1:
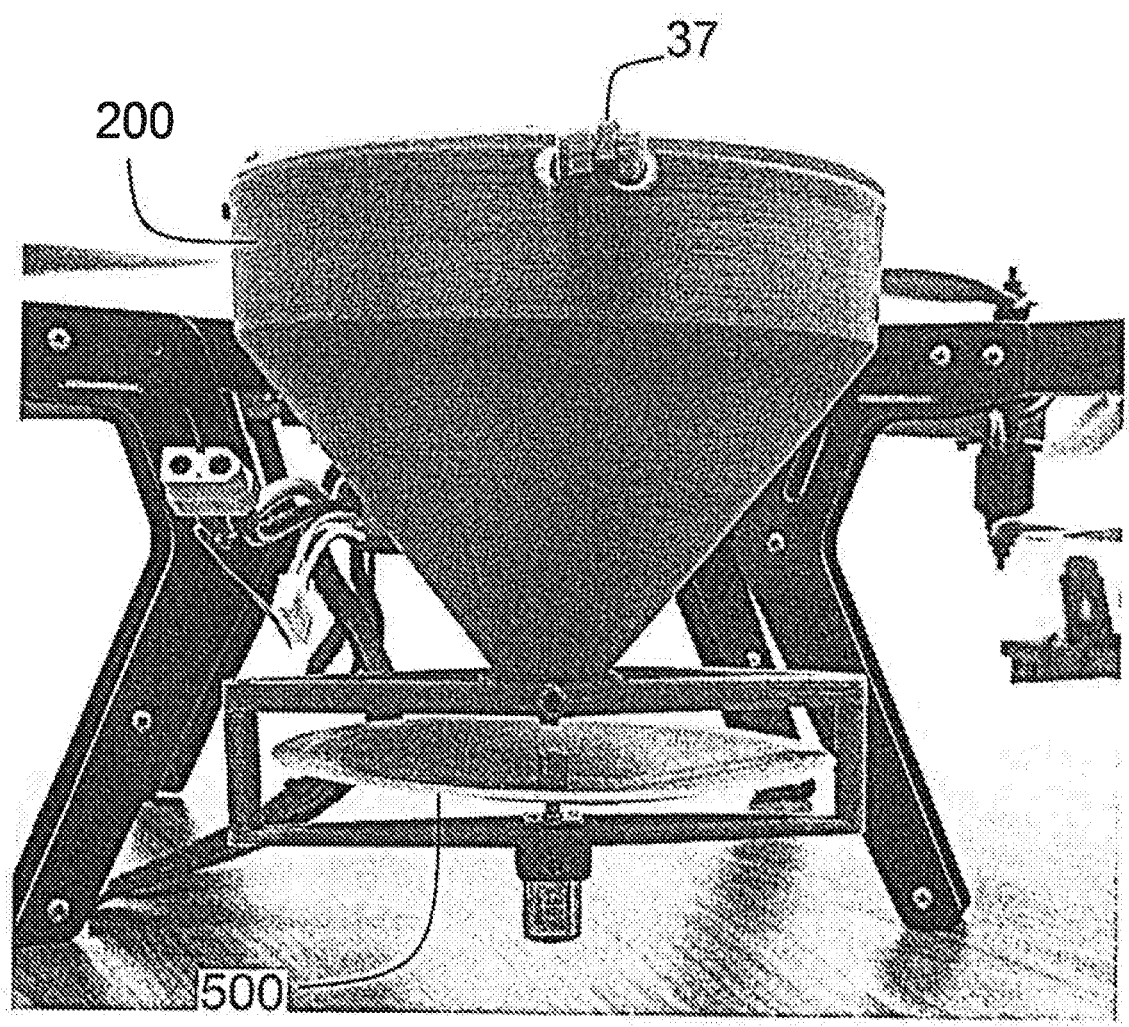
FIG. 1 is a front perspective view of the apparatus.
Figure 1A:
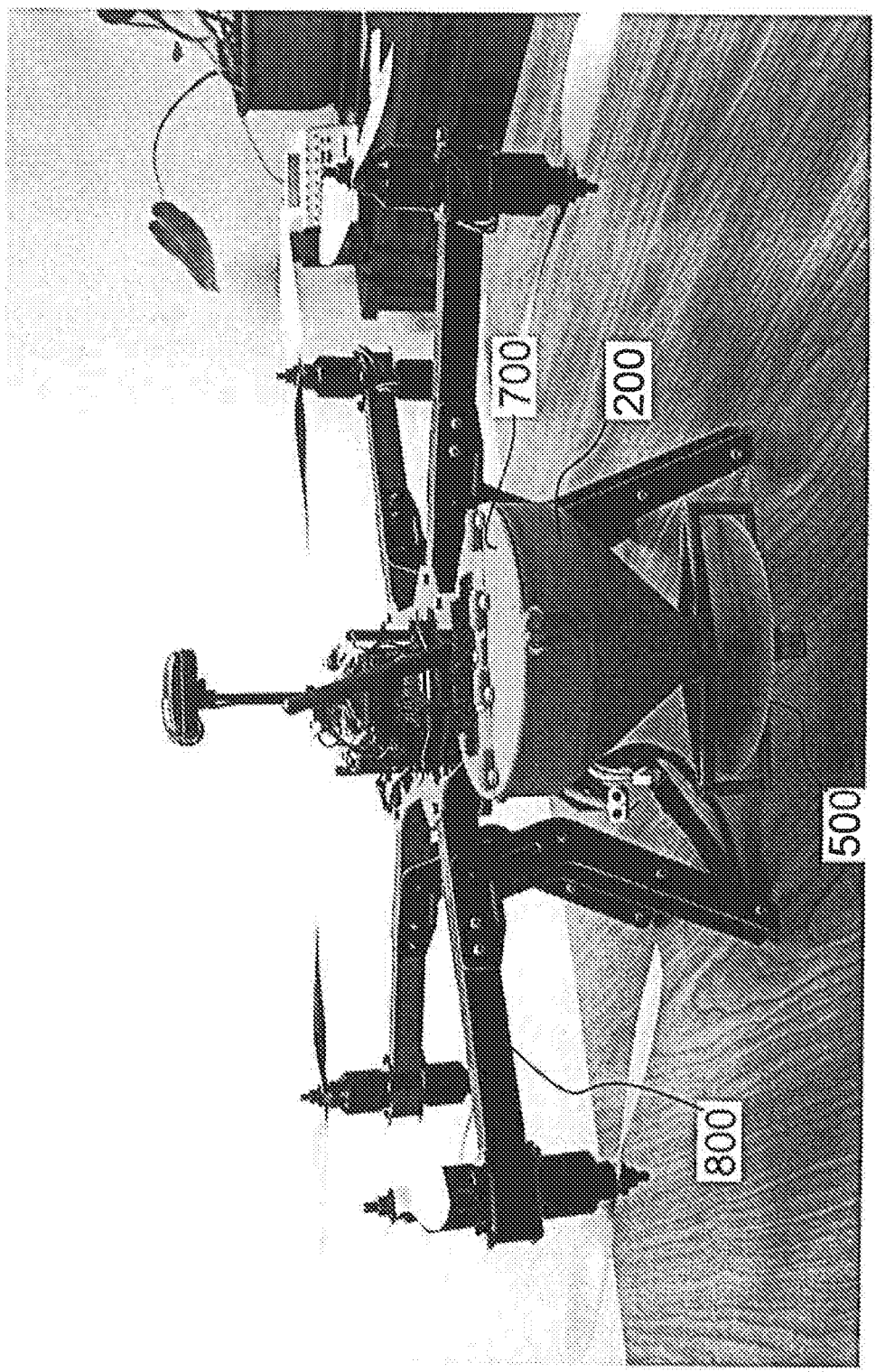
FIG. 1a is a front perspective view of the apparatus used to dispense beneficial biological organisms or materials over a target location when attached to a UAV.
Figure 1B:
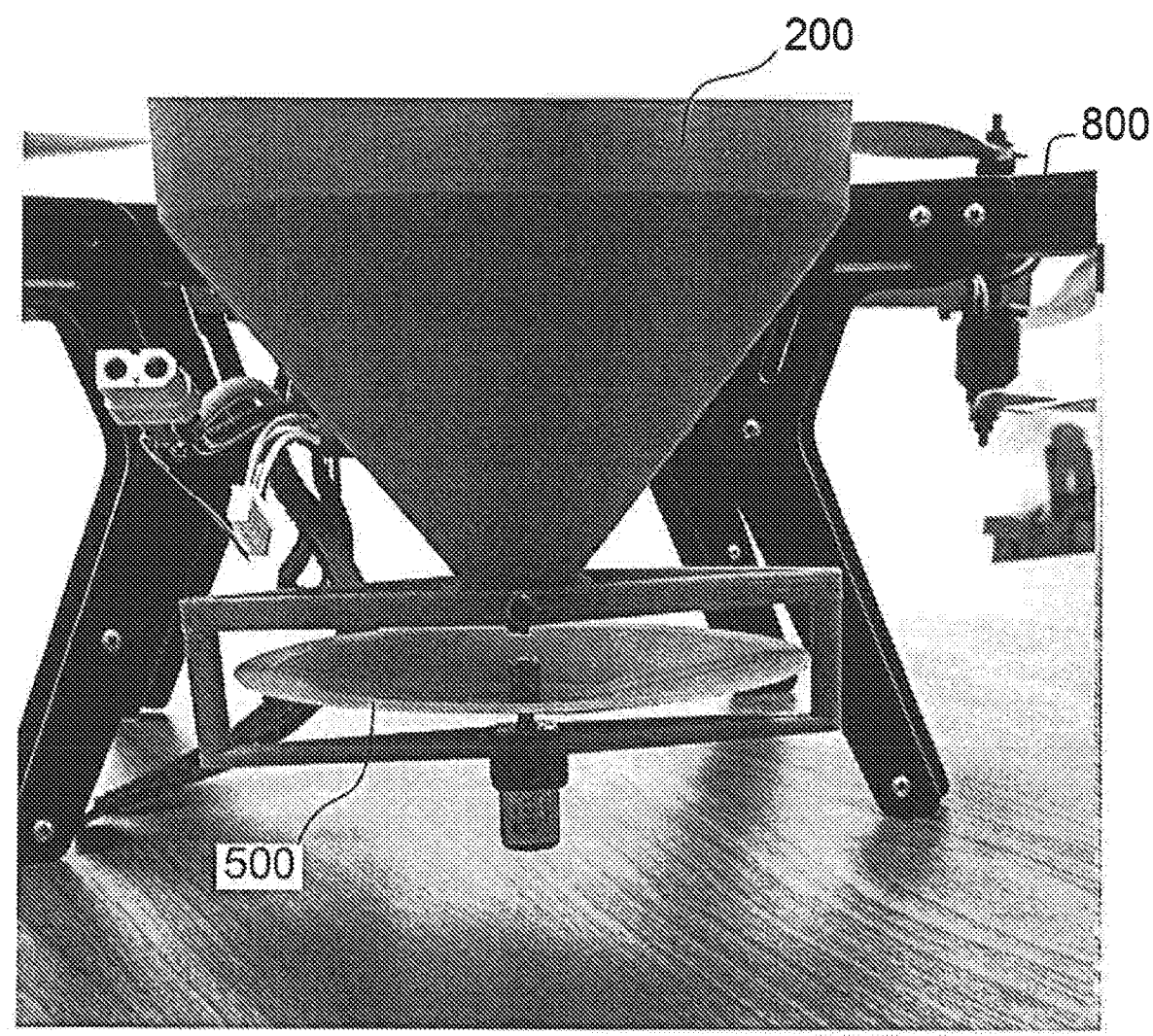
FIG. 1b is a partial front perspective view of the apparatus.
Figure 13A:
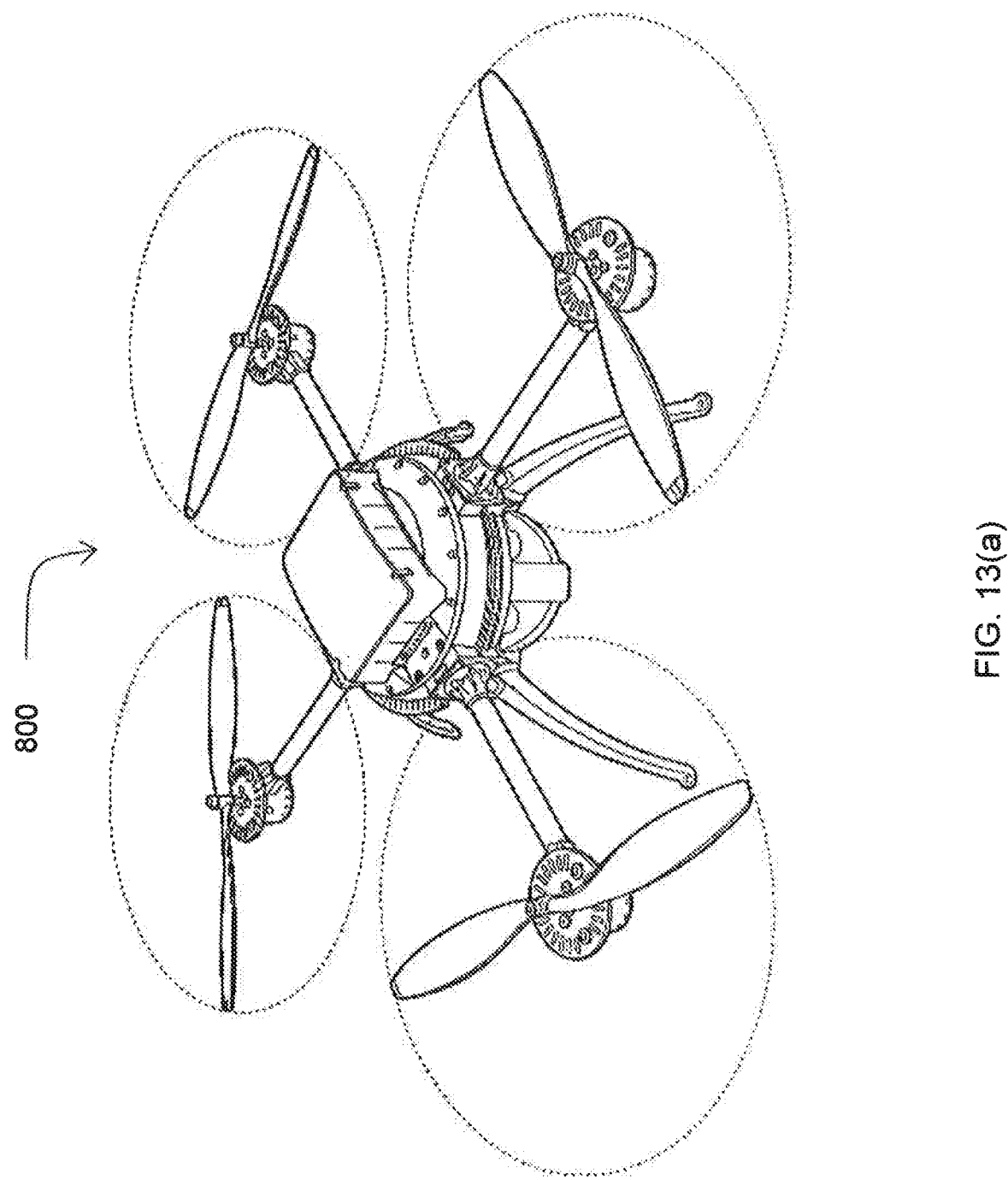
FIG. 13a is a front perspective view of a UAV.
Figure 13B:
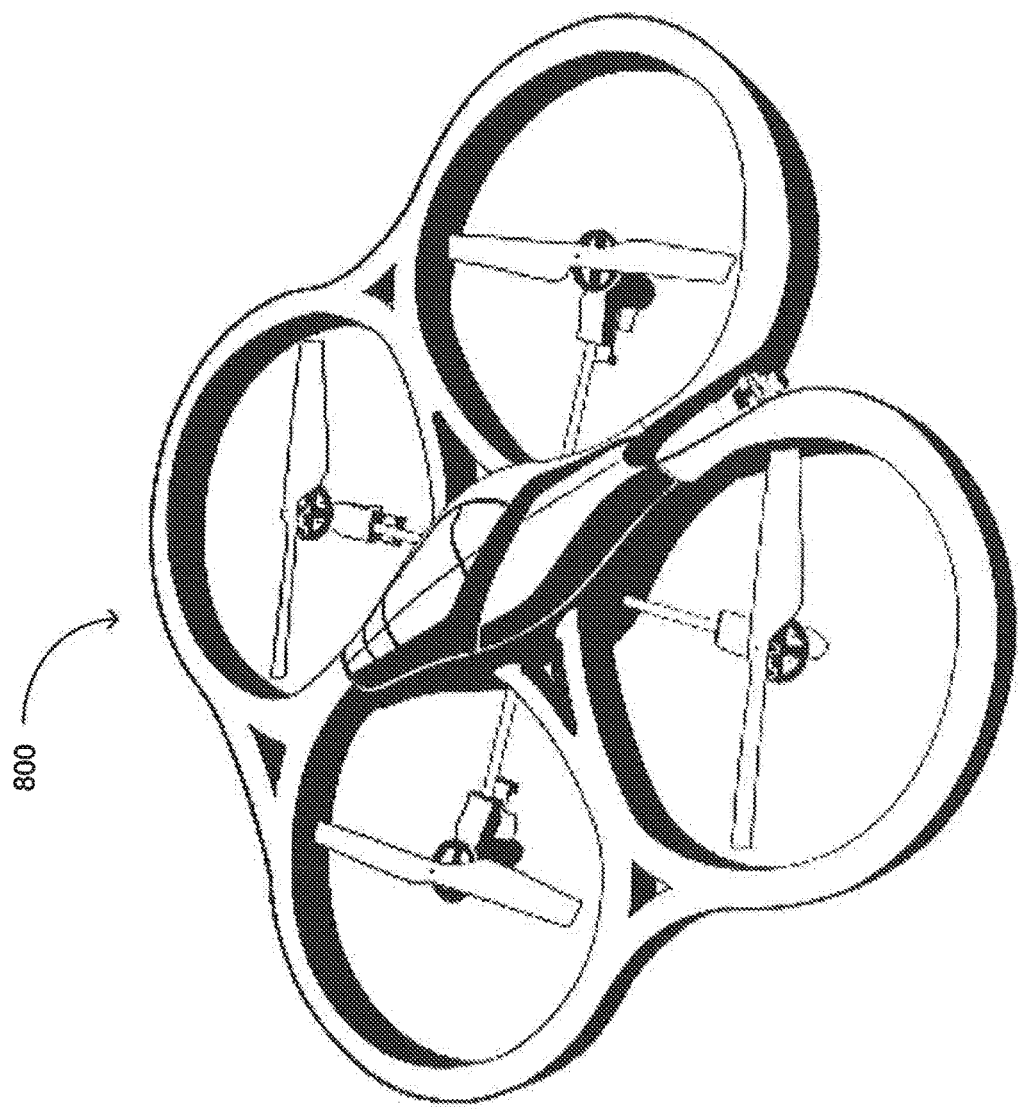
FIG. 13b is an additional perspective view of the apparatus coupled with a UAV.
Figure 13C:
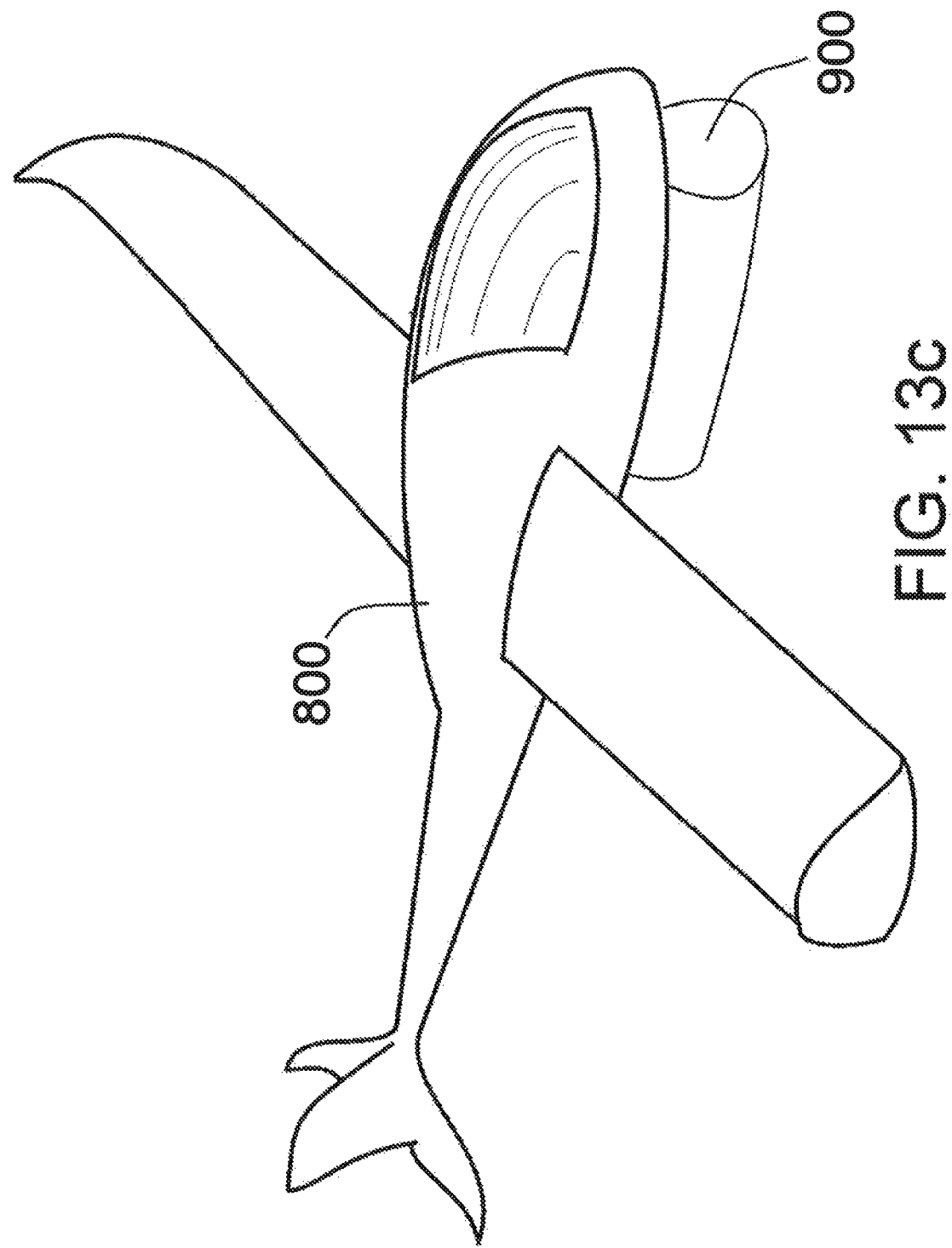
FIG. 13c is perspective view of the apparatus coupled with a fixed-wing UAV.

With reference to FIGS. 1, 1a and 1b, an apparatus 100 used for biologically controlling agricultural pests is shown that can be securely attached to an optional unmanned aerial vehicle (UAV) 800 as illustrated in FIGS. 1a, 13a and 13b. In use, the apparatus 100 can advantageously spread essentially beneficial biological organisms 7 or materials 9 over a selected biological target or target location such as agricultural crops in order to reduce damage caused by the agricultural pests. An example of agricultural pests or organisms known to cause damage to agricultural crops, but not limited to, is mites such as spider mites and insects.

Figure 2:
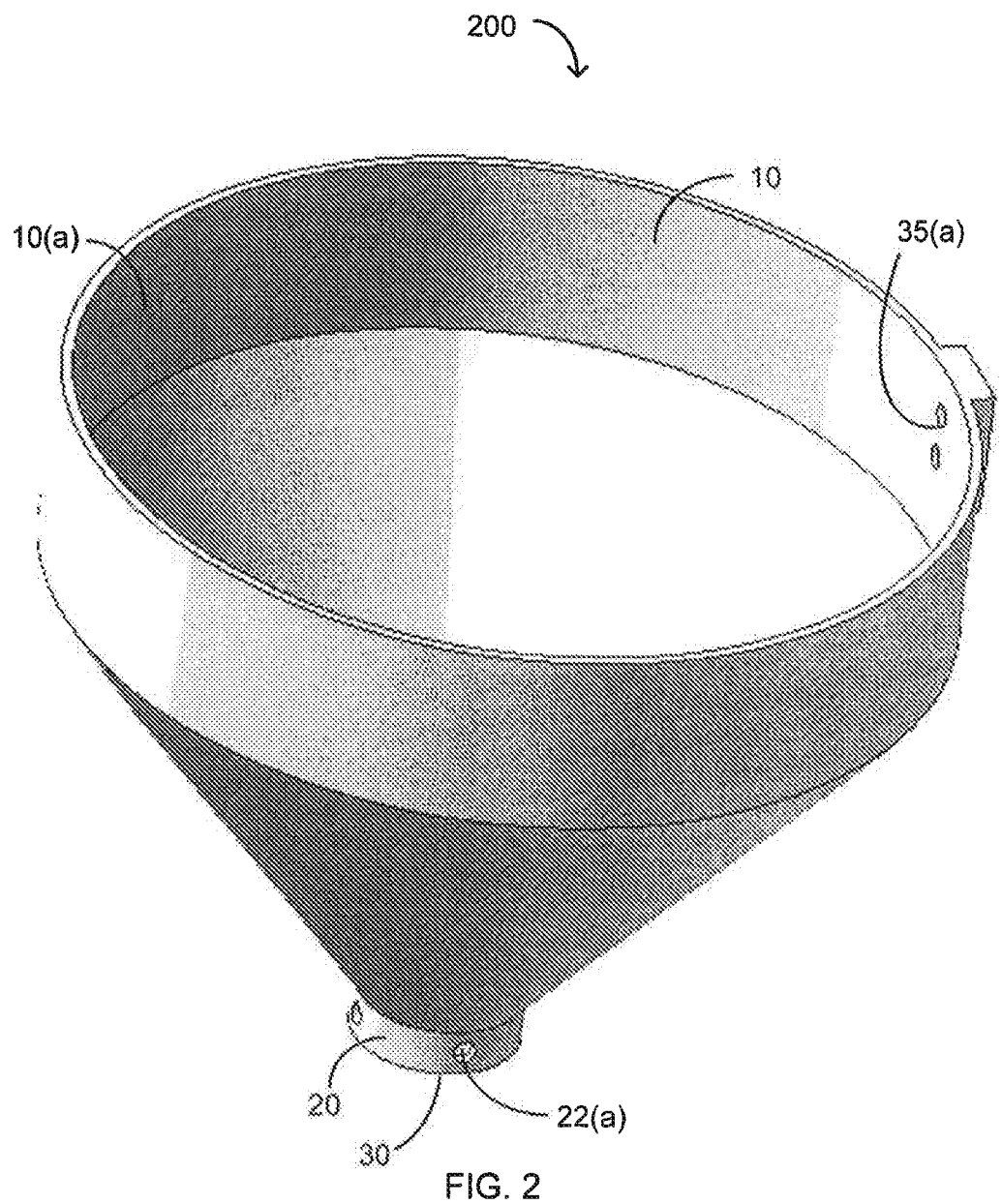
FIG. 2 is a front perspective view of the hopper.
Figure 2A:
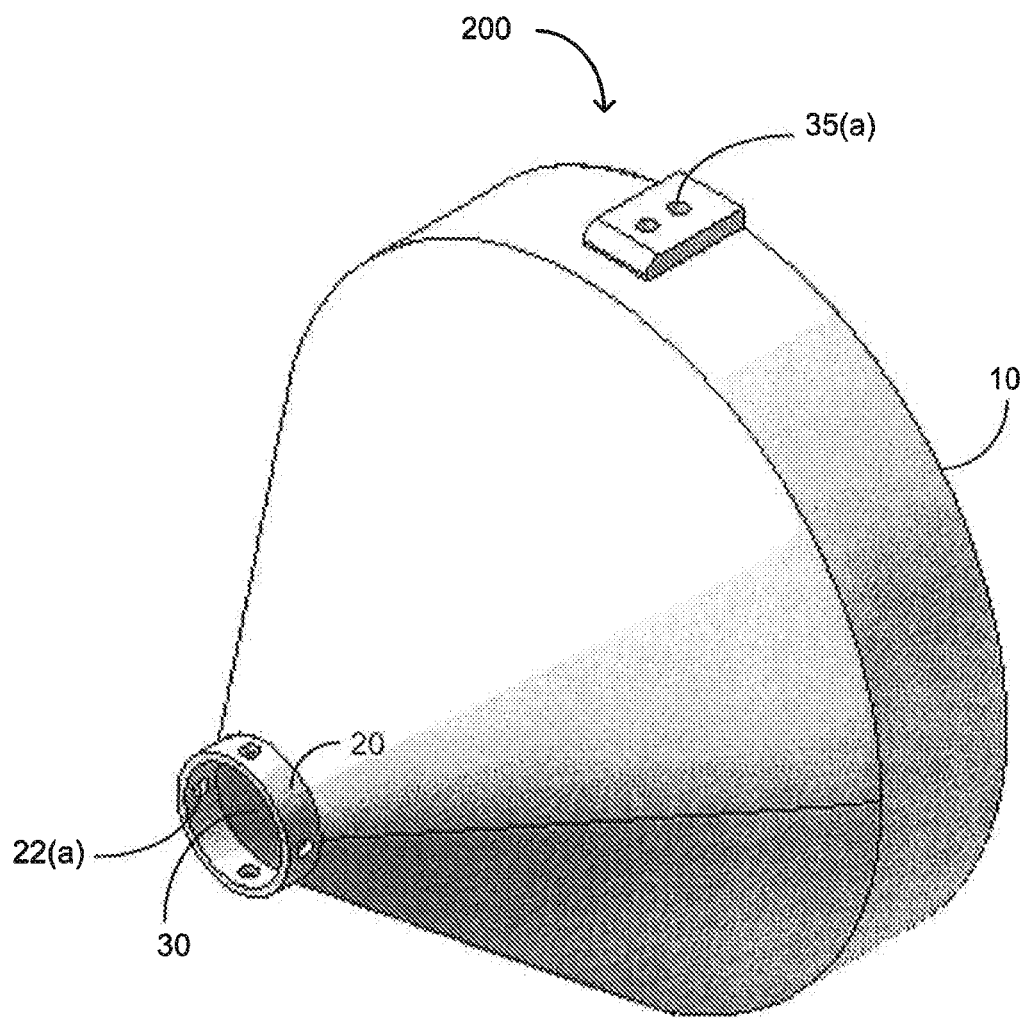
FIG. 2a is a side perspective view of the hopper.
Figure 2B:
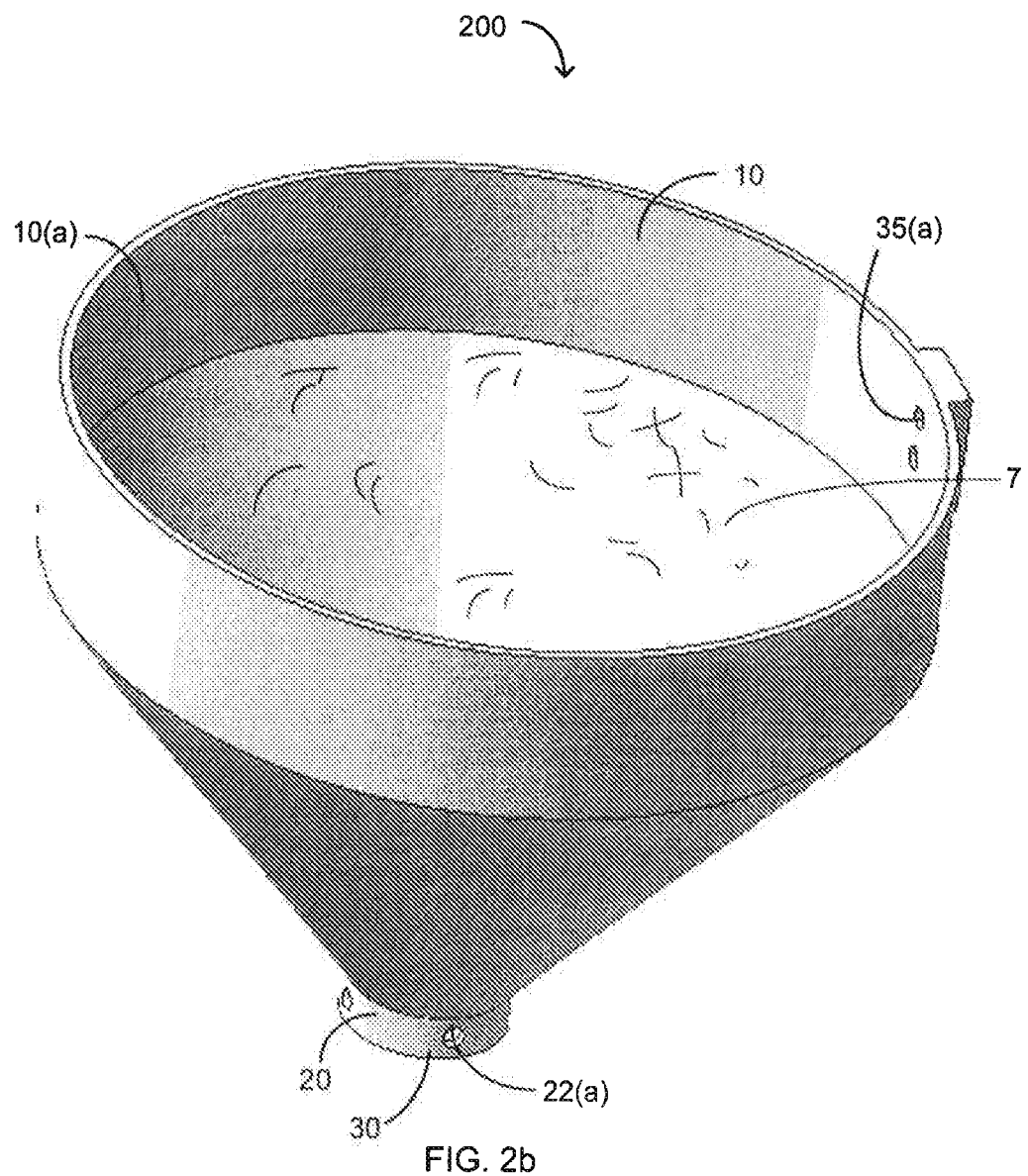
FIG. 2b is a front perspective view of the hopper holding biological organisms.
Figure 2C:
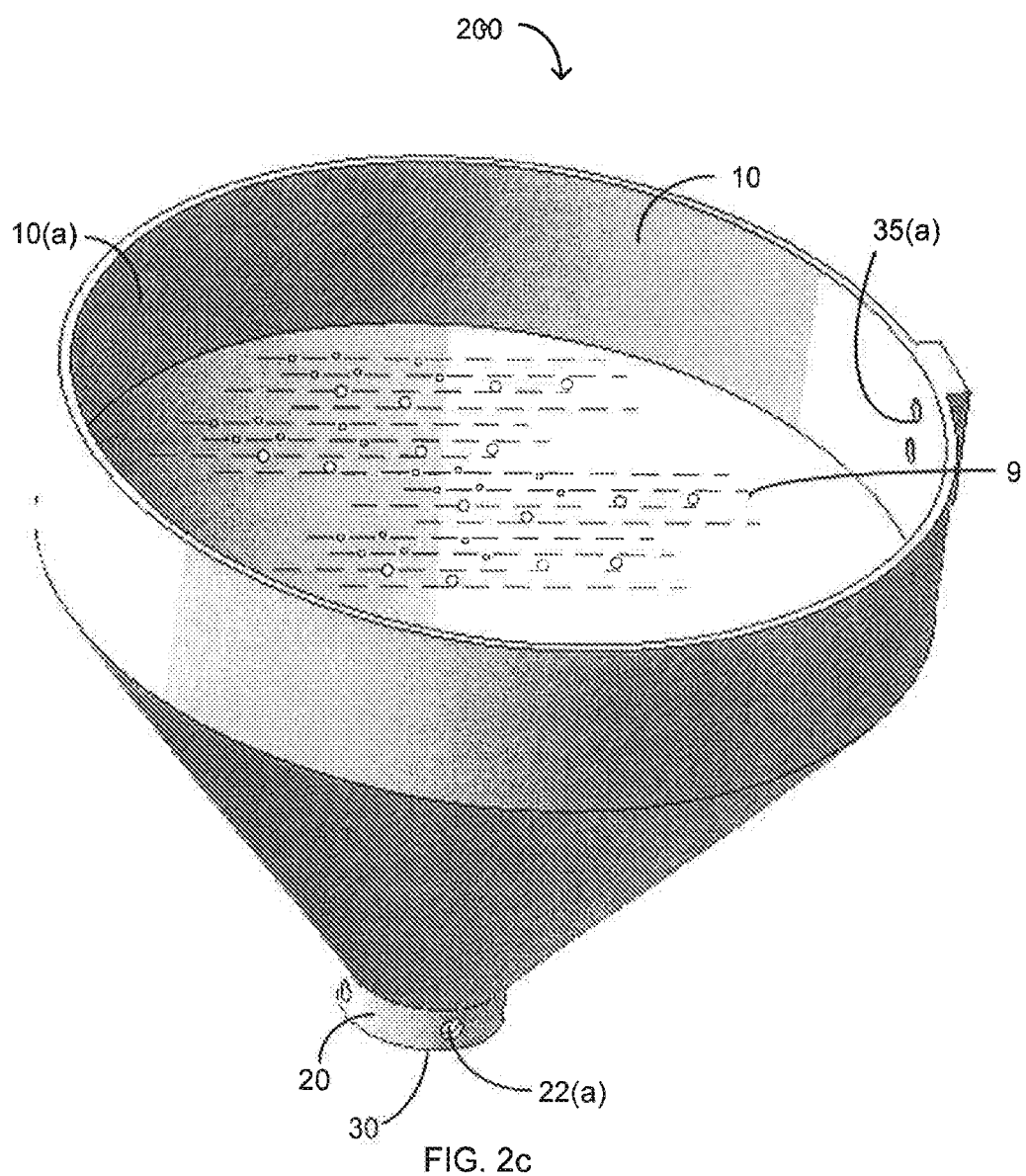
FIG. 2c is a front perspective view of the hopper holding biological materials.

As shown in FIGS. 2, 2a, and 2c, the apparatus 100 includes a container 200 (also referred to as hopper 200) that holds the essentially beneficial biological organisms 7 or materials 9 that are used to control and/or eradicate agricultural pests. The hopper 200 also includes first 10 and second 20 ends and an opening 10 at the first end 10 of the hopper 200 for insertion of the beneficial organisms 7. In addition, the hopper 200 includes a dispenser port 30 located substantially at the second end 20 of the hopper 200 for dispensing the beneficial organism or materials on a biological target or target location to be treated. For example, the hopper 200 could contain predatory mites such as the *Phytoseiulus persimilis* that feed on spider mites and their eggs. Also, existing systems include predatory mites being enclosed loosely in the hopper 200 or mixed with vermiculite for enhancing the suitability of their environment. Additionally, the hopper or any other container can accommodate various other carriers in conjunction with the biological organisms or materials 9. For example, the hopper 200 could contain a mixture of the predatory mites mixed with sawdust or the like or even mixed with both sawdust and vermiculite in order to enhance their environment.

Referring still to FIGS. 2 and 2a, the hopper 200 further includes spinner motor screw holes 22a which may be aligned with the spinner motor mount screw holes 22b (See FIGS. 6 and 6b) when the spinner motor mount connection area 45 (See FIGS. 6 and 6b) is securely connected to the second end 20 of the hopper 200. The hopper 200 will also have mounting screw holes 35a which may be aligned with the auger motor mount screw holes 35 (See FIGS. 3 and 3a) for securing the auger motor mount 300 to the hopper 200. The auger motor mount 300 (See FIGS. 3 and 3a) may be mounted to an auger motor mount area 10a that is located within the hopper 200 as shown in FIG. 2.

Figure 3:
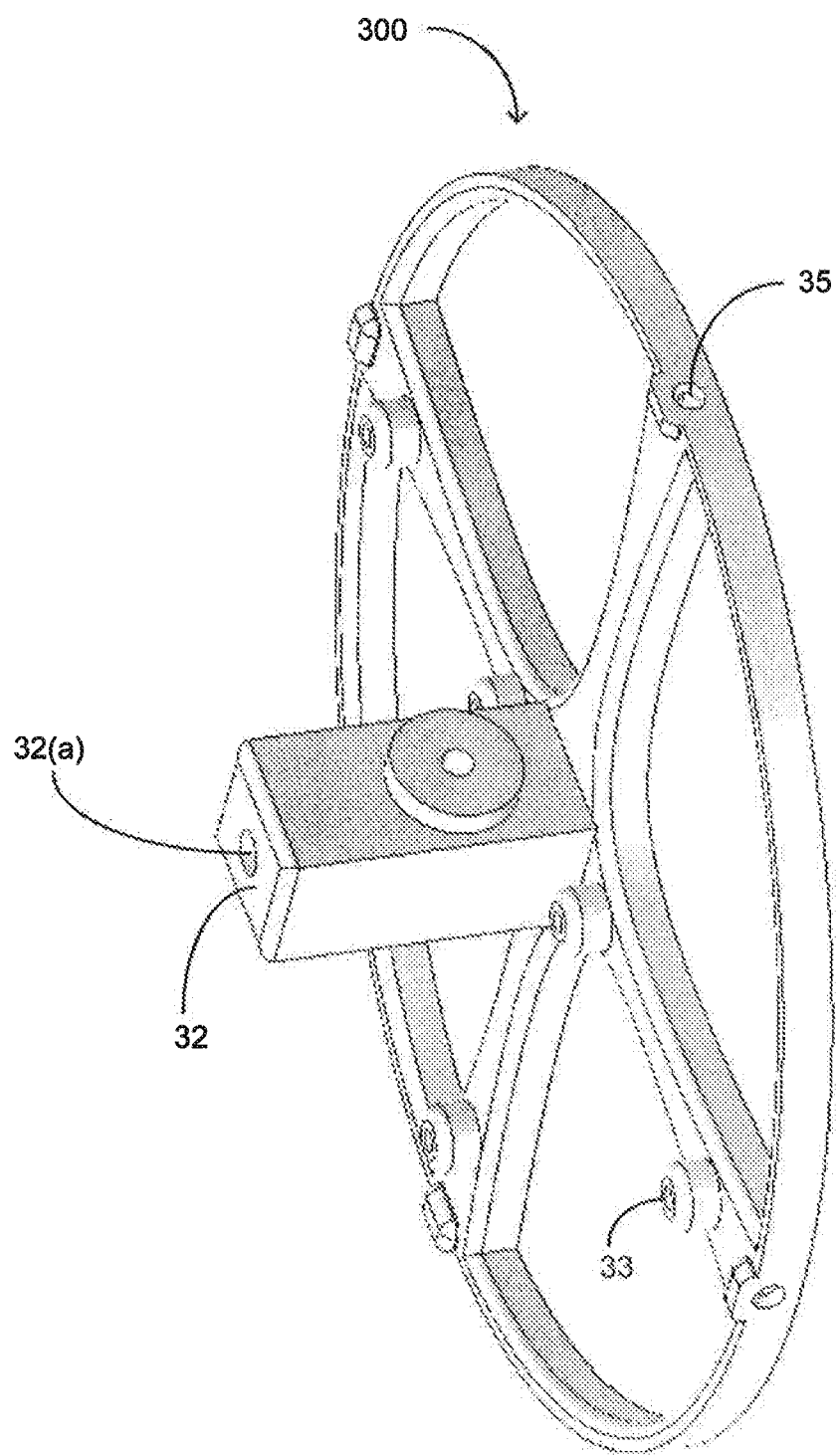
FIG. 3 is a side perspective view of the auger motor mount.
Figure 3A:
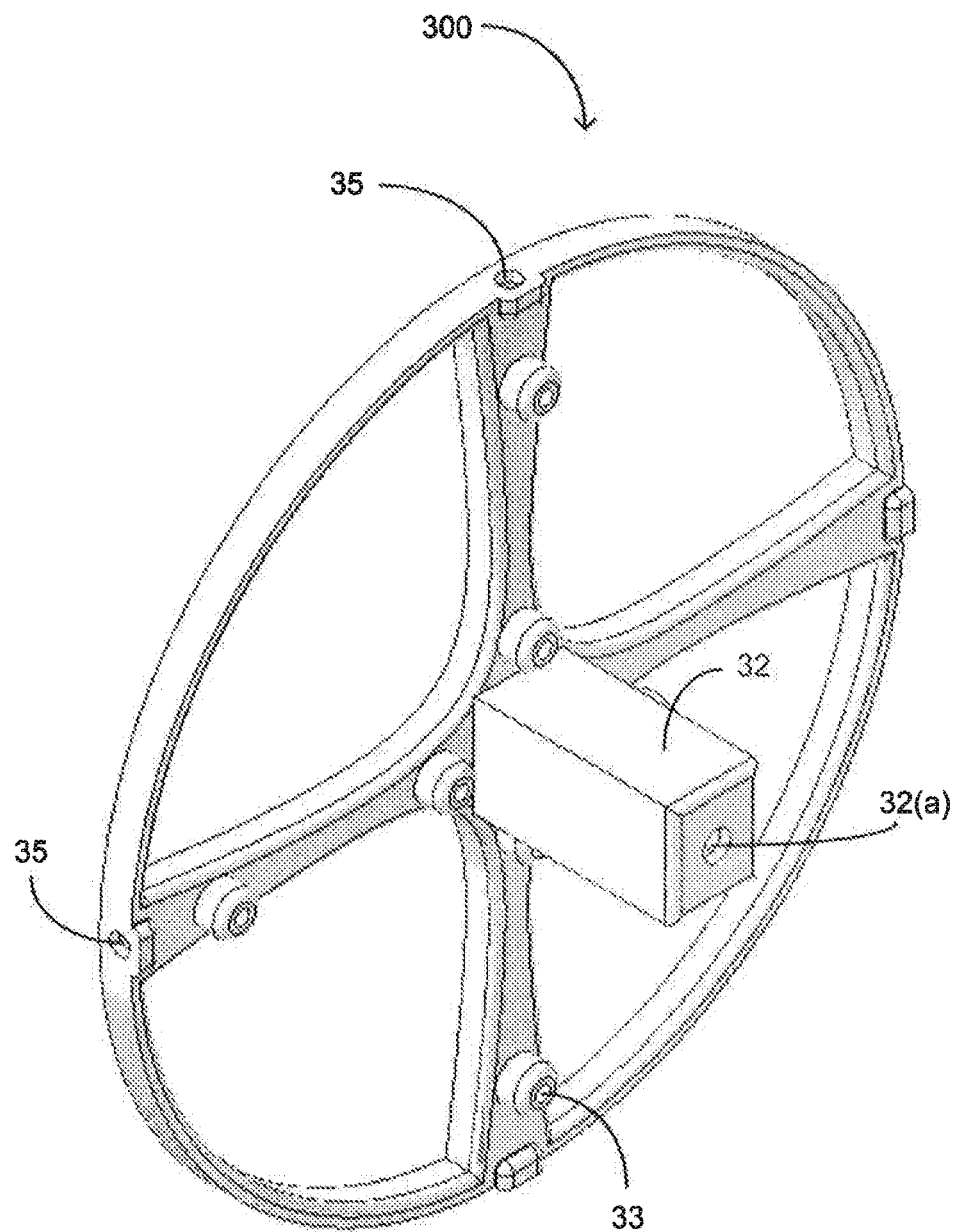
FIG. 3a is a front perspective view of the auger motor mount.

In FIGS. 3 and 3a, an auger motor mount 300 is shown which may be mounted within the hopper 200 as previously described above. The motor mount 300 will have fastening insert holes 33 for allowing an optional lid 700 to be mounted to the motor mount 300 when it is inserted in the hopper 200 and screws inserted into the screw insert slots 33a located on the lid 700. Moreover, the auger motor mount 300 will also have auger motor mount screw holes 35 (See FIGS. 3 and 3a) which may be aligned with the mounting screw holes 35a for securing the auger motor mount 300 to the hopper 200.

Figure 4:
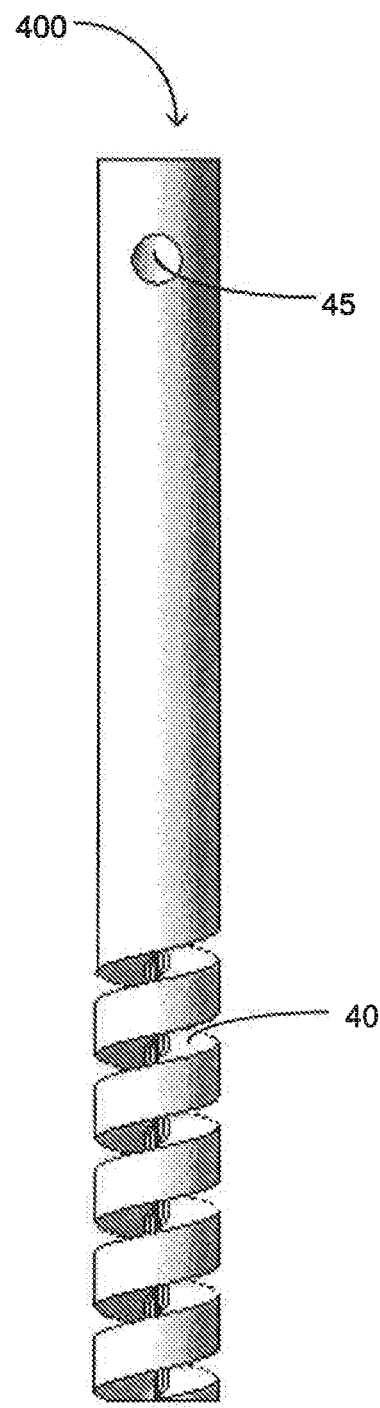
FIG. 4 is a front perspective view of the auger.
Figure 4A:
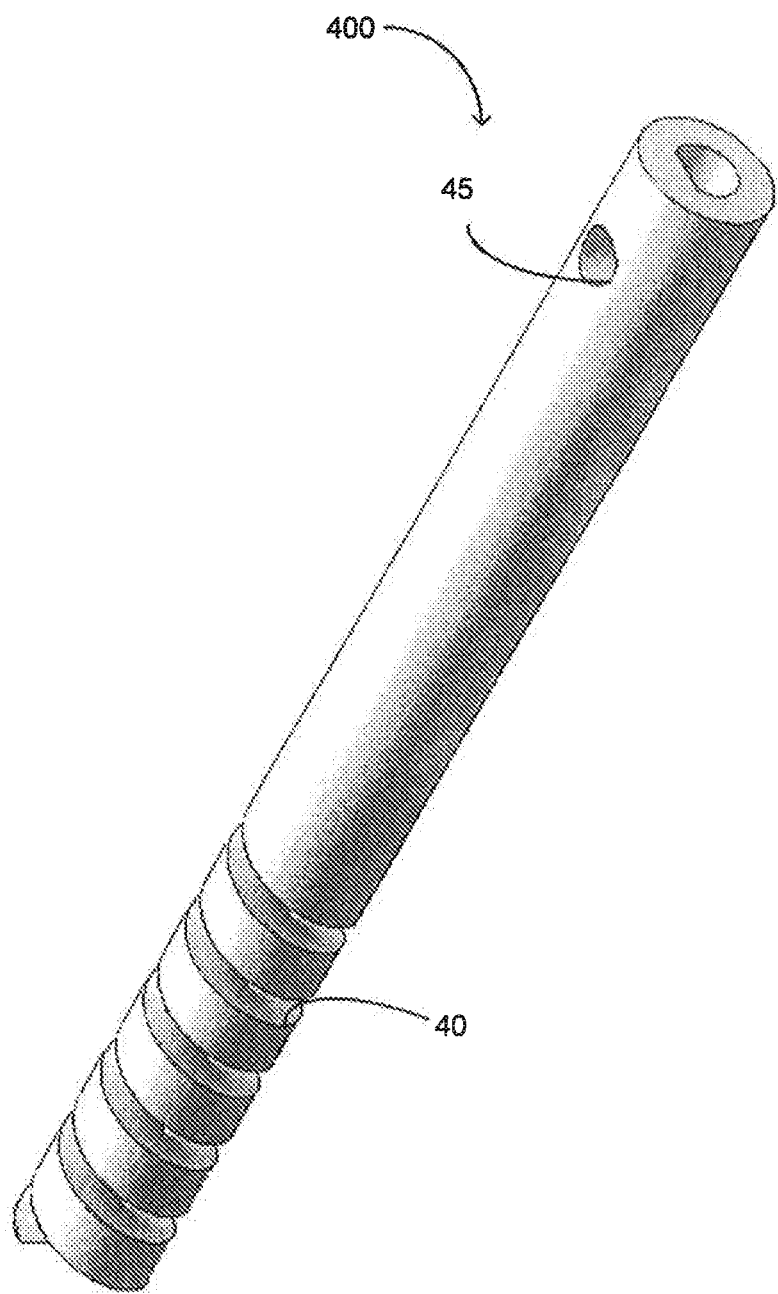
FIG. 4a is another front perspective view of the auger.
Figure 4B:
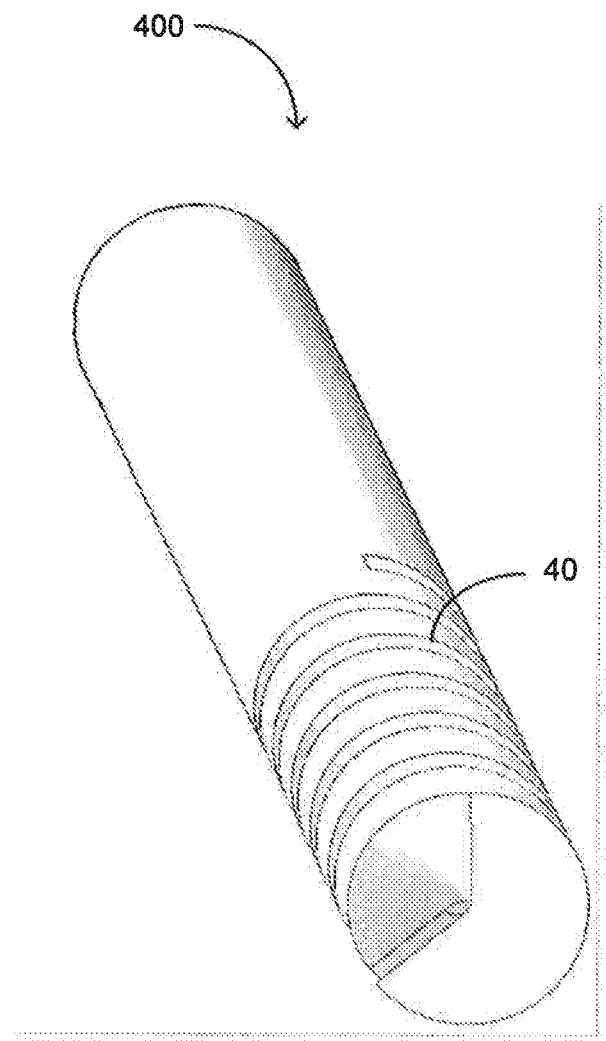
FIG. 4b is a further front perspective view of the auger.
Figure 4C:
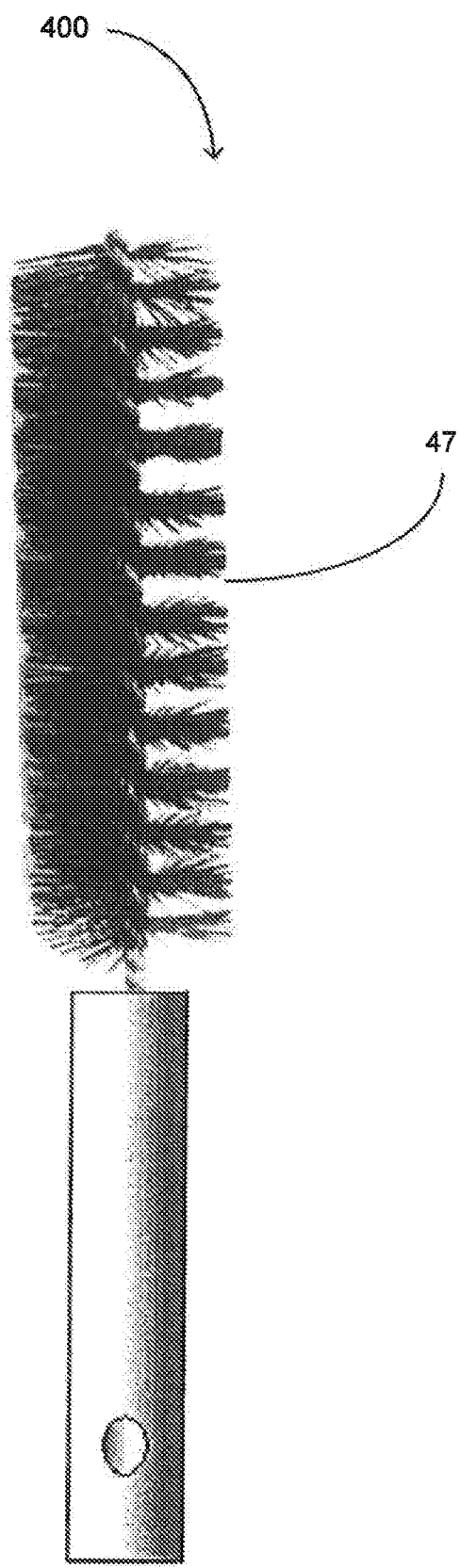
FIG. 4c is a front perspective view of the auger having a plurality of wire brushes.
Figure 4D:
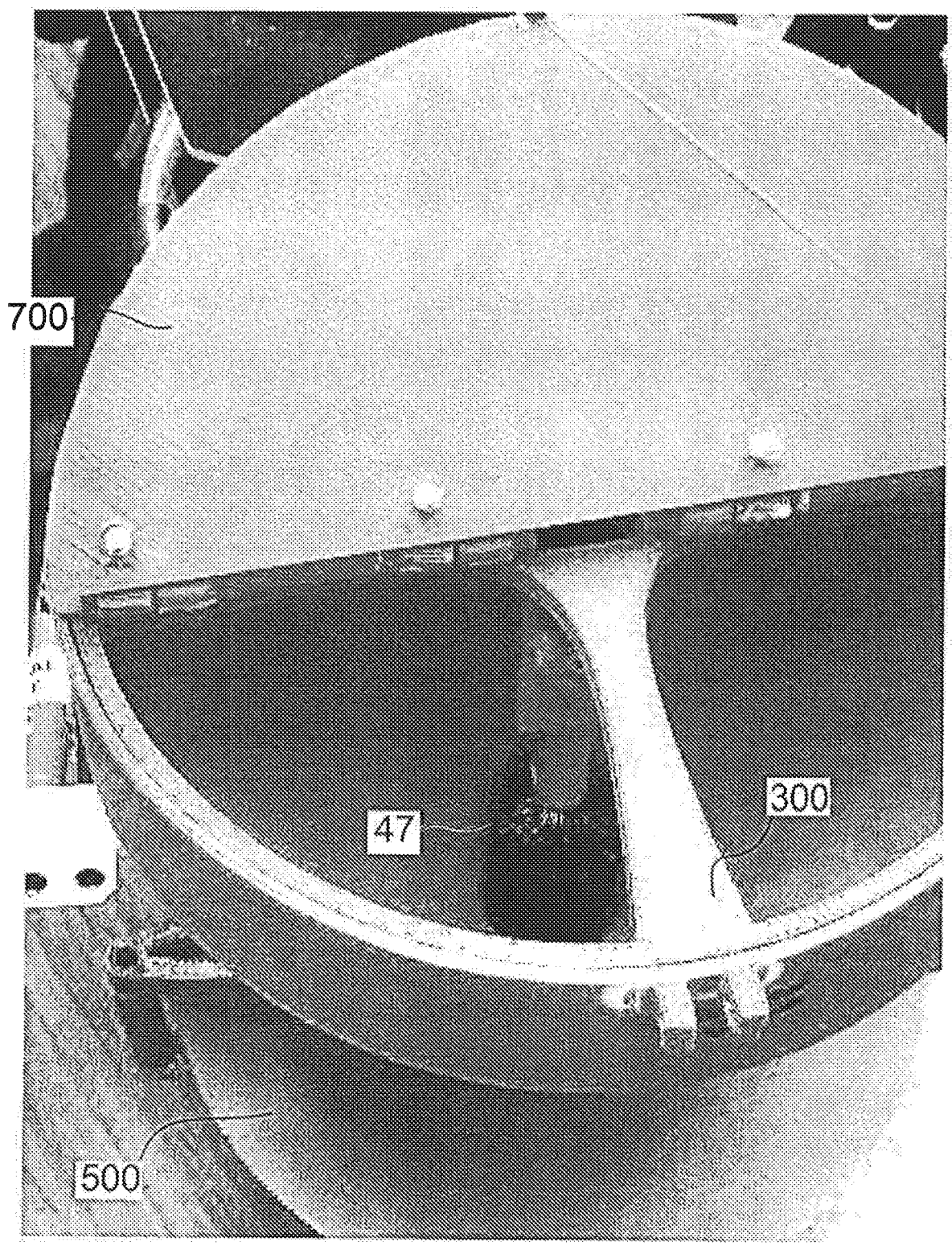
FIG. 4d is a partial top perspective view of the auger having a plurality of wire brushes.
Figure 12:
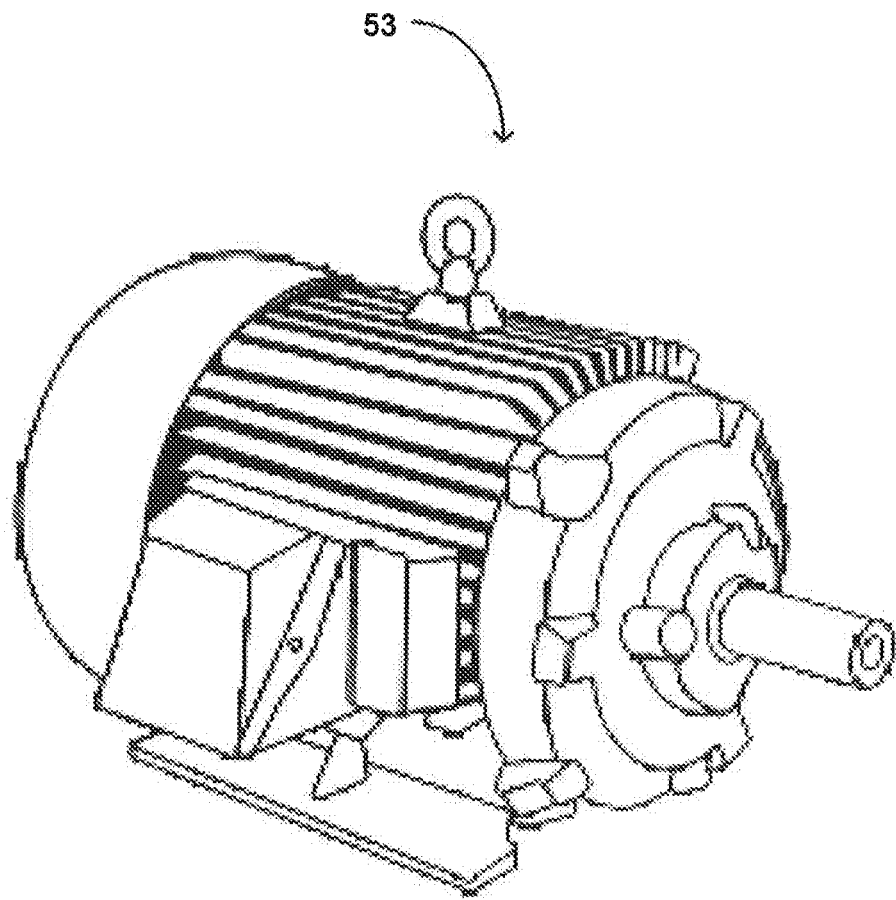
FIG. 12 is a front perspective view of the motor for the spreader agitating device.
Figure 12A:
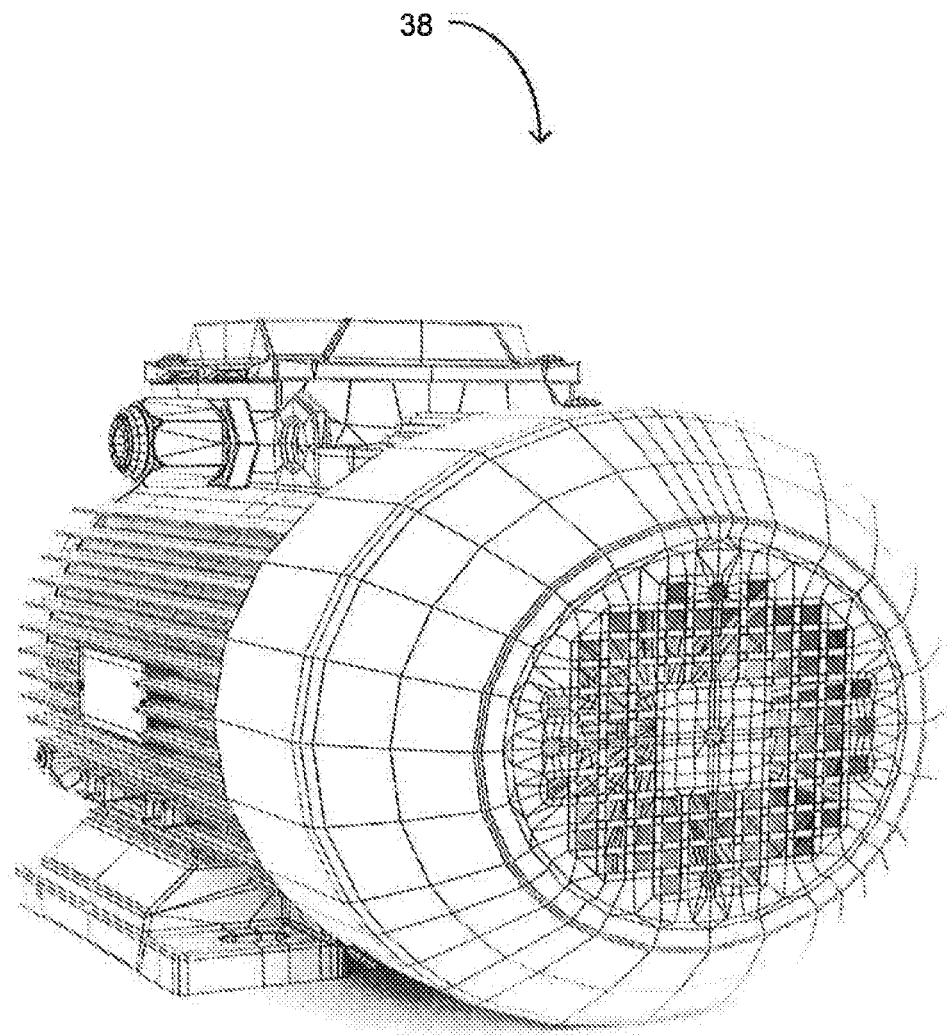
FIG. 12a is a front perspective view of the motor for the auger.

Referring still to FIGS. 3 and 3a, the auger motor mount 300 includes a first motor holding area 32 for securing and holding a first motor 38 (See FIG. 12a) that will beneficially drive an auger 400 mounted to said motor 38 (See FIGS. 4, 4a and 4b). Additionally, the auger 400 may be inserted through an auger insertion hole 32a and mounted to the first motor 38 by means of a shank hole 45 as illustrated in FIGS. 4 and 4a. Further, the auger 400 includes spurs 40 for connecting and securing spiral like wire brushes 47 as depicted in FIGS. 4c and 4d.

Figure 5:
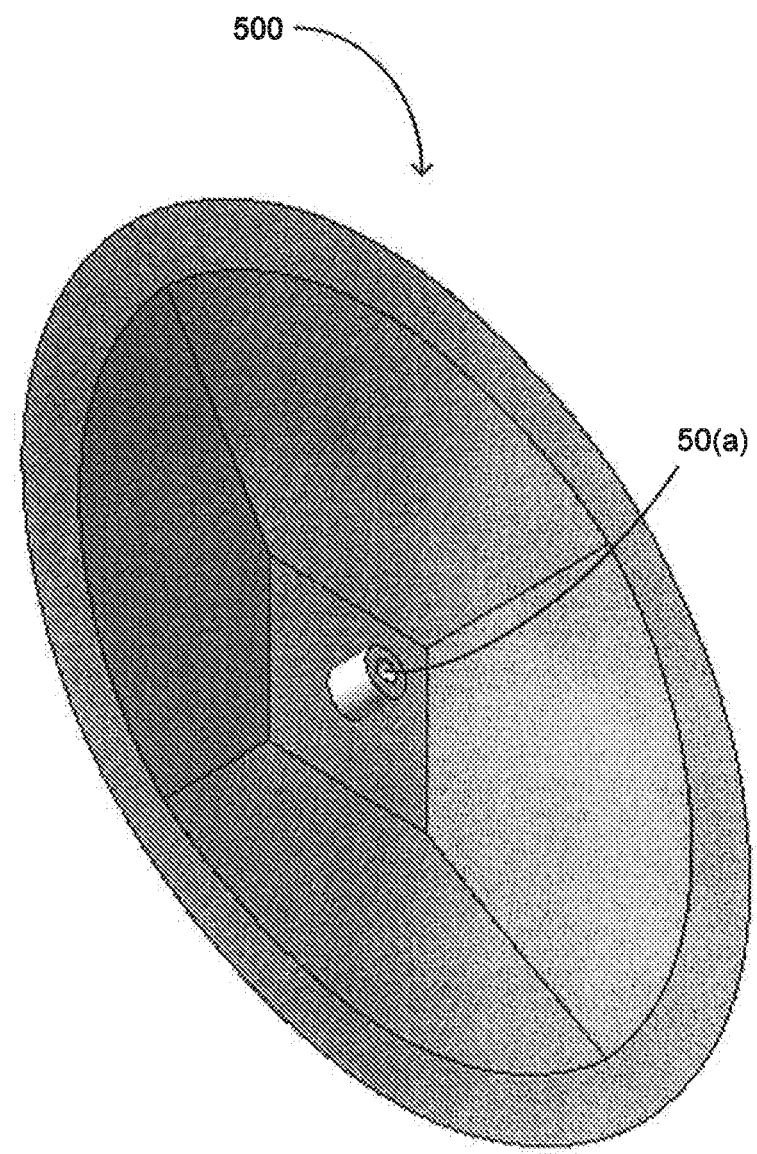
FIG. 5 is a front view of the spreader agitating device.
Figure 5A:
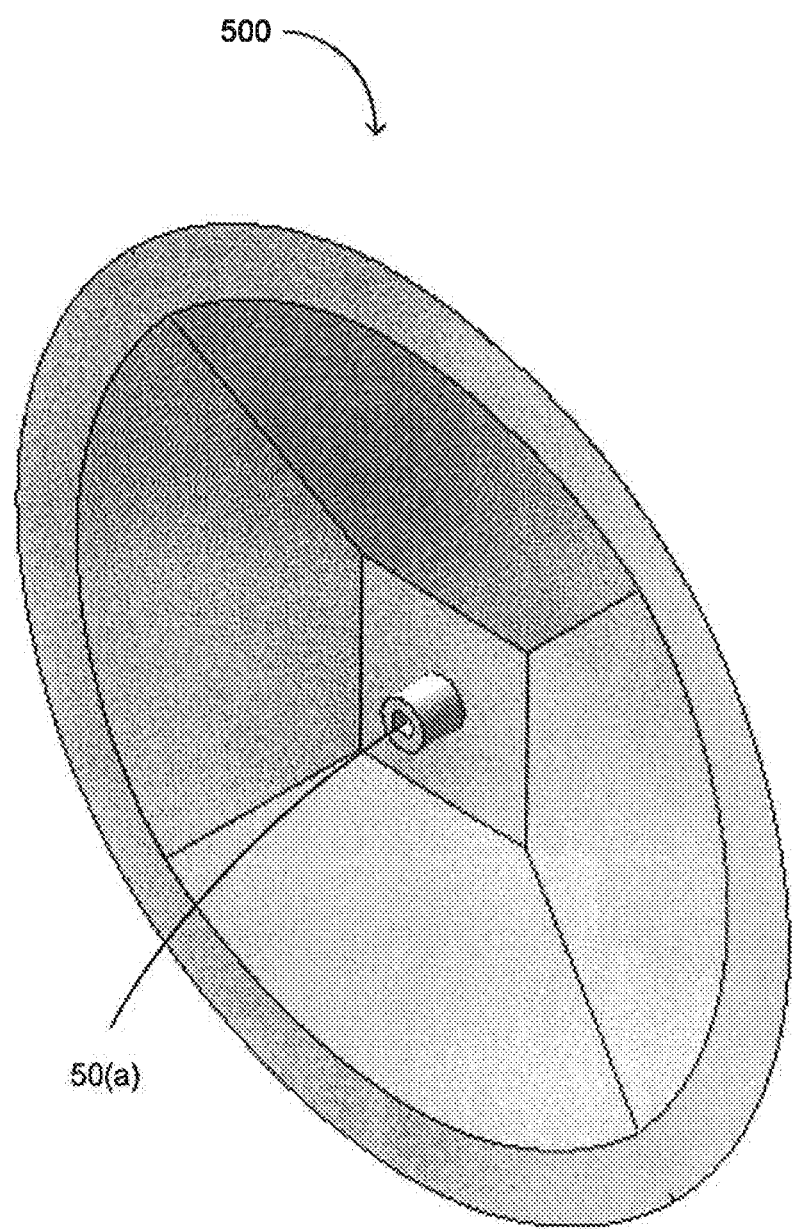
FIG. 5a is another front view of the spreader agitating device.
Figure 6:
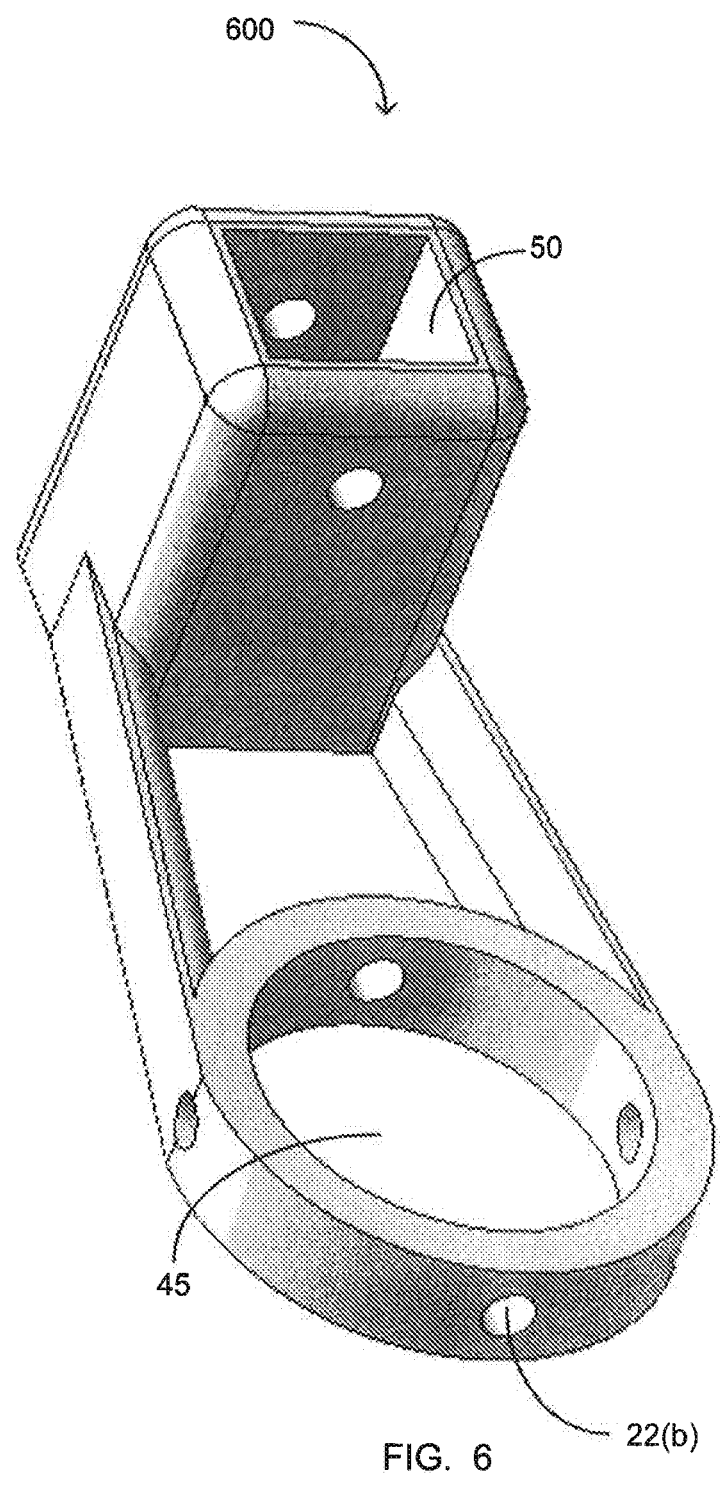
FIG. 6 is a front perspective view of the spreader motor mount.
Figure 6A:
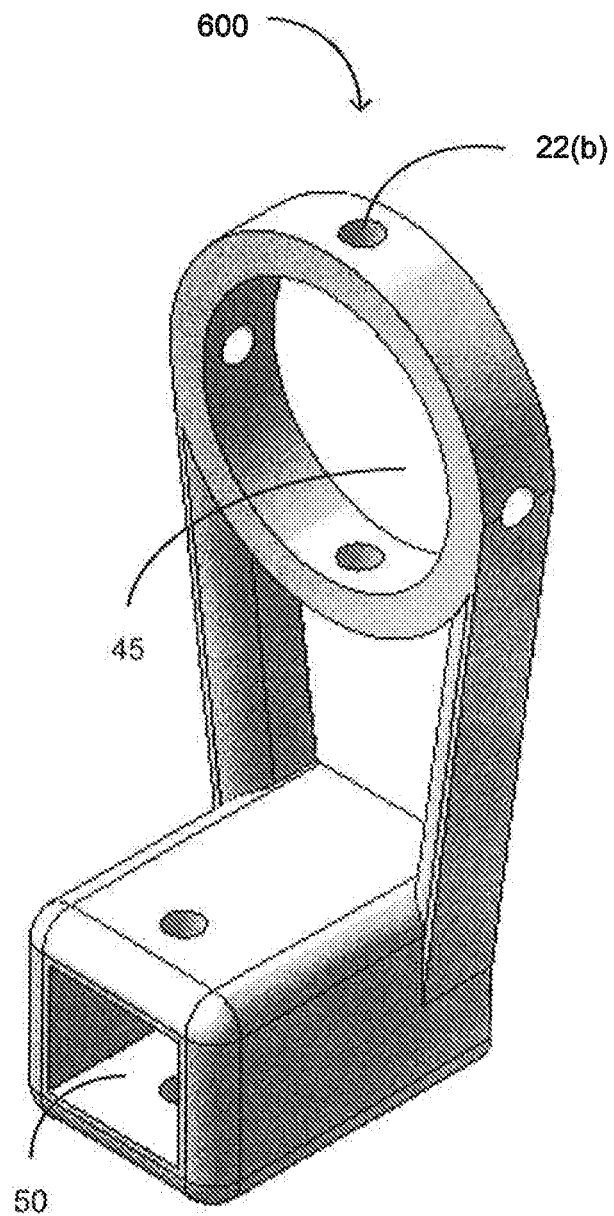
FIG. 6a is another front perspective view of the spreader motor mount.

Referring now to FIGS. 5 and 5a, a spreader agitating device 500 is shown. The spreader agitating device 500 is mounted to and driven by a second motor 53 (See FIG. 12) for spreading the essentially beneficial biological organisms 7 or materials 9 over the biological target to be treated. The second motor 53 is also secured and held in a second motor holding area 50 that is located on the spreader motor mount 600 as shown in FIGS. 6 and 6a.

In use, the spinner motor mount connection area 45 of the spreader mount 600 is securely mounted to the second end 20 of the hopper 200. In this configuration, the spreader agitating device 500 is connected to the second motor 53 by fastening the agitating connector 50a to the second motor 53.

Figure 7:
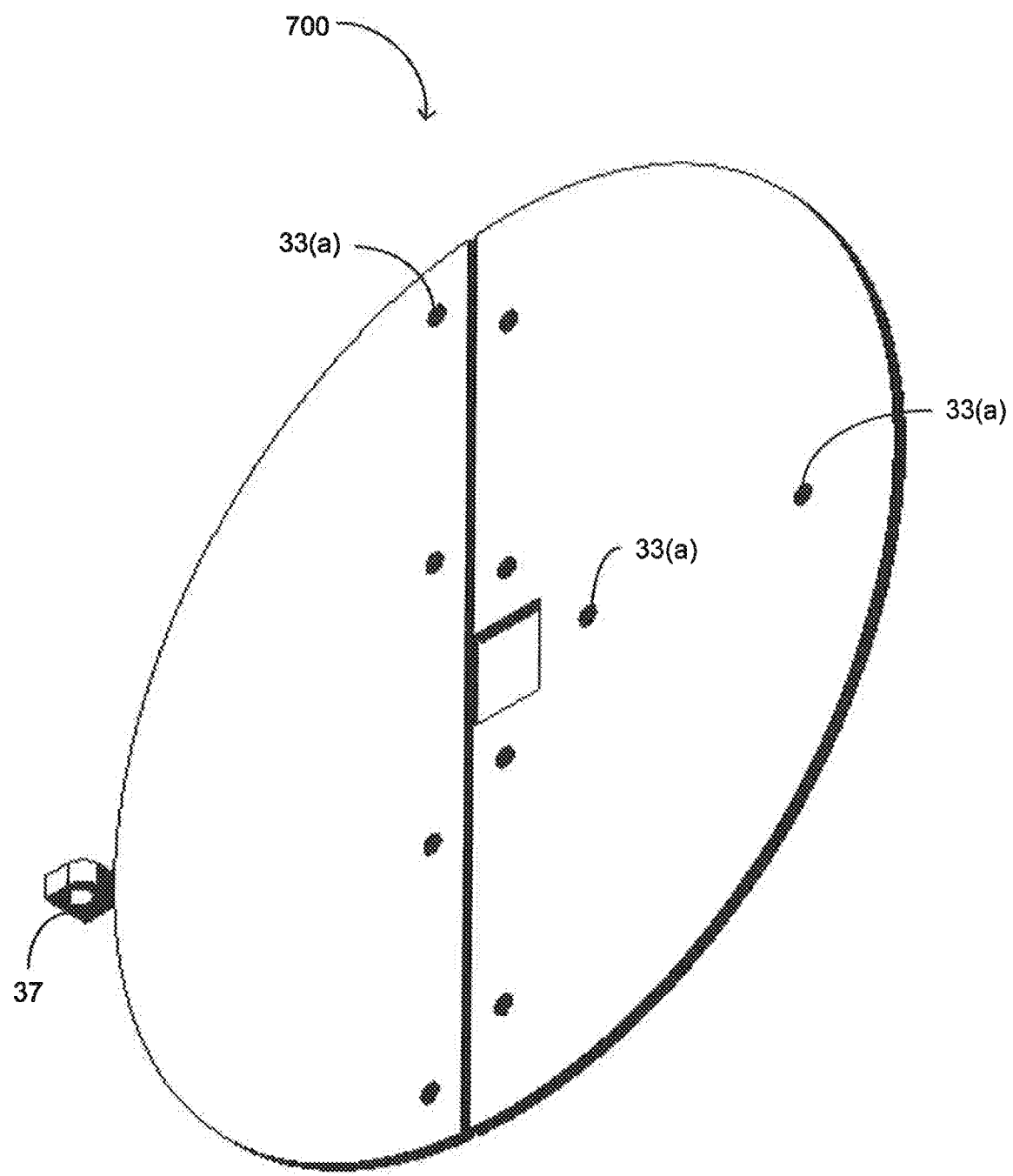
FIG. 7 is a front perspective view of the hopper lid.
Figure 7A:
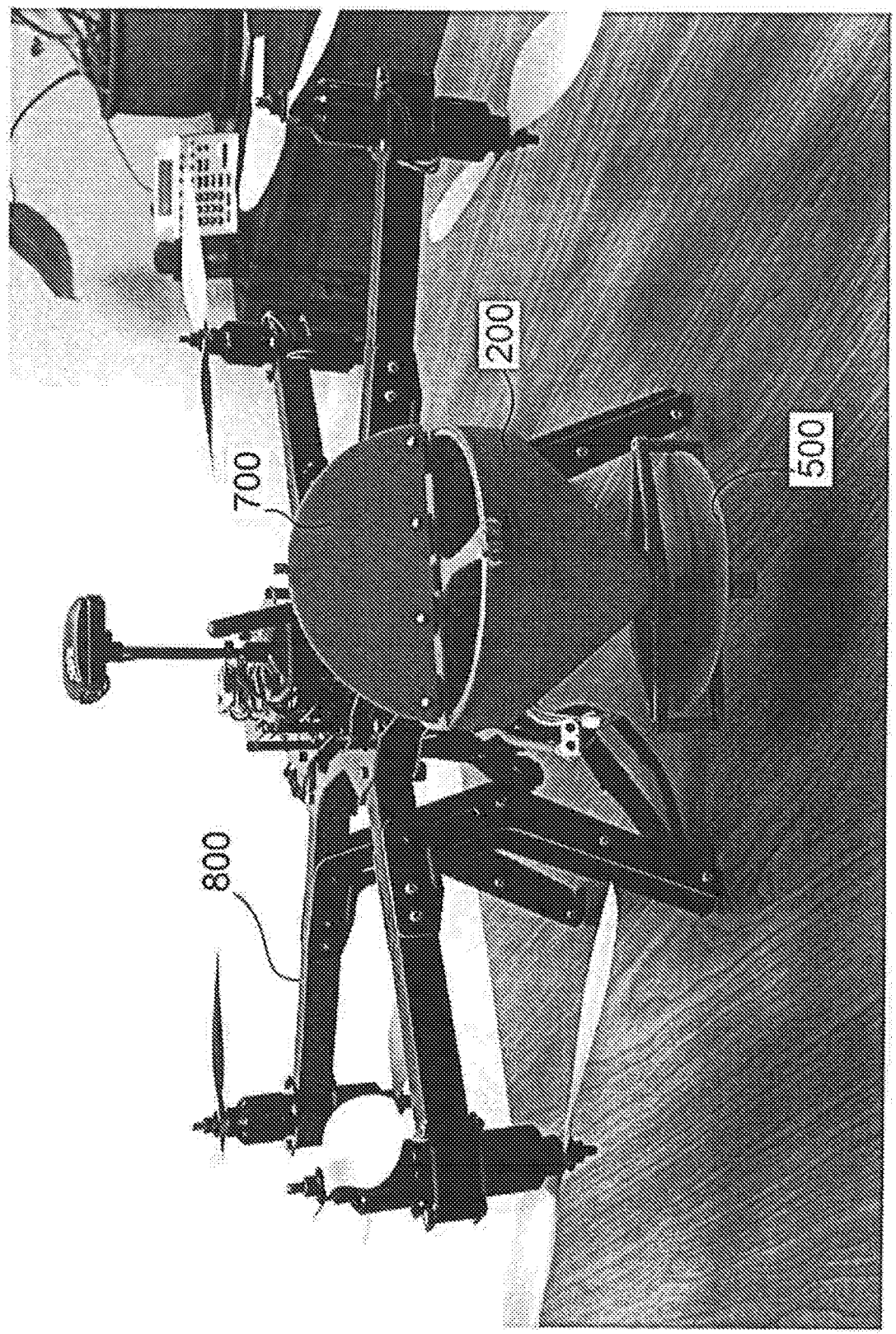
Figure 8:
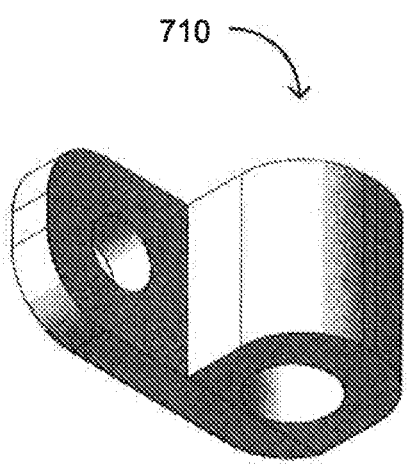
FIG. 8 is a front perspective view of the hinge for the hopper lid.
Figure 9:
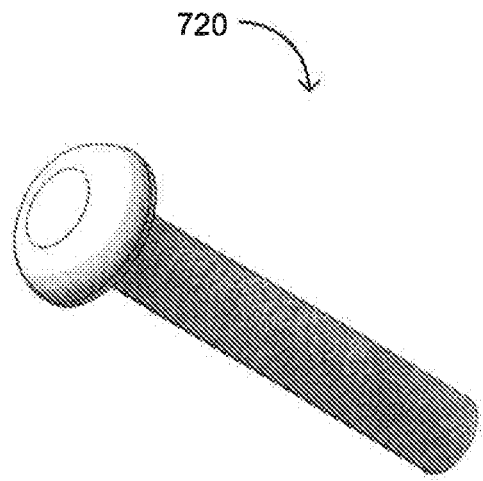
FIG. 9 is a front perspective view of the hinge pin for the hopper lid.
Figure 10:
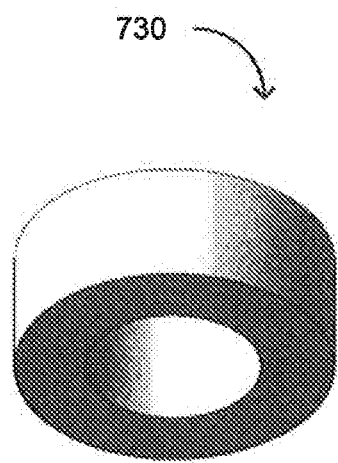
FIG. 10 is a front perspective view of the hinge pin cap for the hopper lid.
Figure 11:
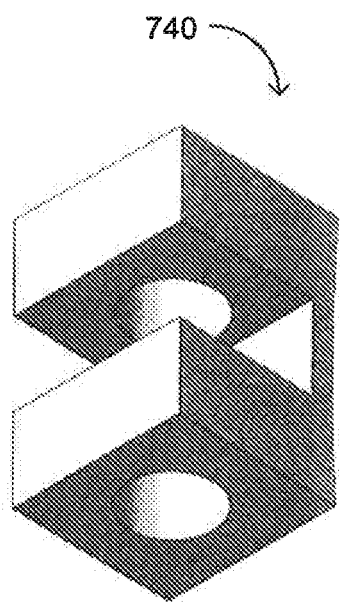
FIG. 11 is a front perspective view of the lid lock hinge.

Alternatively, one embodiment of the invention includes a lid 700 for securing the essentially beneficial biological organisms or materials within the hopper 200 (See FIG. 7). Another embodiment of the invention will include an optional lid 700 that opens on one end and remains closed on the other end (See FIG. 7a). To open the lid 700 on one end, the following components are needed: a hinge 710 (See FIG. 8), a hinge pin 720 (See FIG. 9) and a hinge pin cap 730 (See FIG. 10). Optionally, the hinge 710, hinge pin 720 and hinge pin cap 730 can be fastened to the screw insert slots 33a located on the opening end of the lid 700 for allowing one end of the lid to open and close as shown in FIG. 7a. A further option of the invention allows for a lid lock hinge 11 to be securely fastened to the top portion of the hopper 200 in order to allow the lid 700 to be securely sealed by a fastening mechanism 37 when in the closed position (See FIG. 7).

In operation, the apparatus 100 is securely mounted to an optional unmanned aerial vehicle (UAV) 800 (See FIGS. 1, 1a, 13a, 13b, and 13c) with essentially beneficial biological organisms 7 (also referred to as biological control agents) or materials 9 securely enclosed within the hopper 200. After the biological organisms such as predatory mites are secured in the hopper, the UAV may be flown over an agricultural crop (i.e., biological target) such as a strawberry field or a state legalized marijuana field and the apparatus 100 will then advantageously spread the essentially beneficial biological organisms 7 or materials 9 over the selected biological target.

Referring still to the apparatus 100 in operation, the essentially beneficial biological organisms 7 or materials 9 are released from the hopper 200 when the auger 400 is spinning and the spiral like wire brushes 47 advantageously push or agitate the essentially beneficial biological organisms out and through the dispenser port 30. After the essentially beneficial organisms or materials (e.g., predatory mites such as persimilis mites) have been released from the dispenser port 30, they are beneficially spread over the target location by the spreader agitating device 500 as it spins while the apparatus 100 is flying over the target. Optionally, the flight path of the apparatus 100 can be advantageously controlled by a global positioning system (GPS) in order to uniformly apply the essentially beneficial biological organisms on and/or over the selected targets to be treated.

Figure 15A:
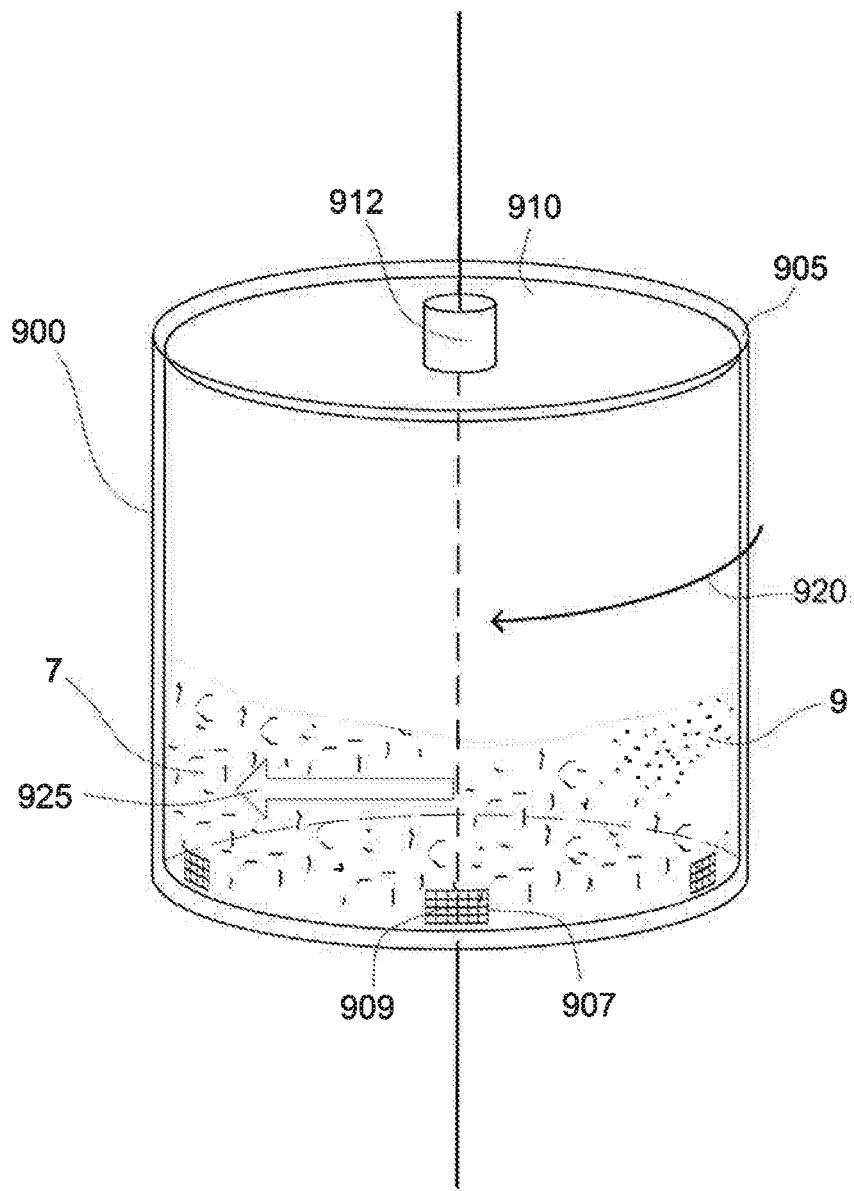
FIG. 15a is a perspective view of an embodiment having a drum for disseminating biological organisms or materials.
Figure 15B:
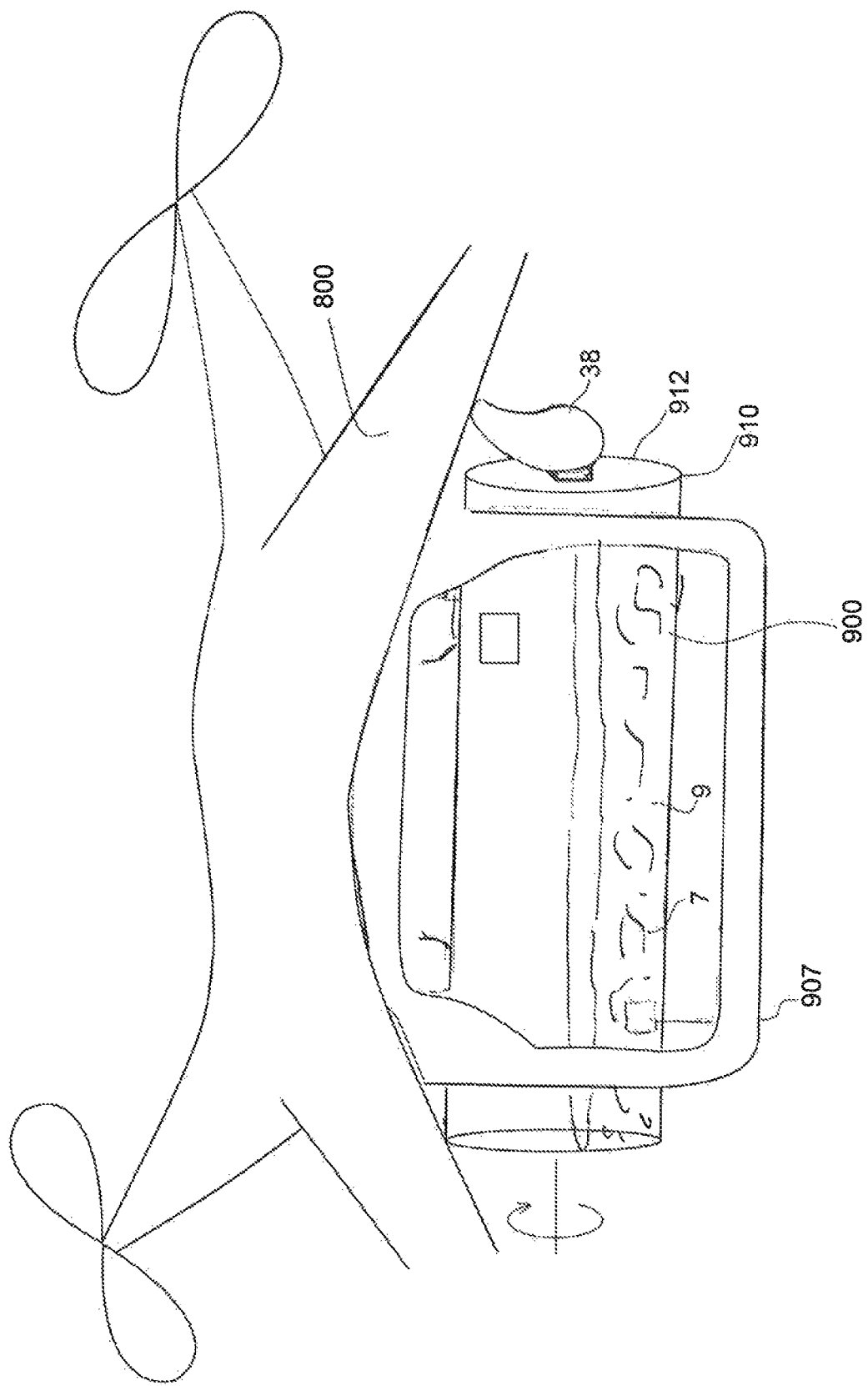
FIG. 15b is a perspective view of an embodiment having a horizontal drum for disseminating biological organisms or materials coupled with a multi copter drone.
Figure 16:
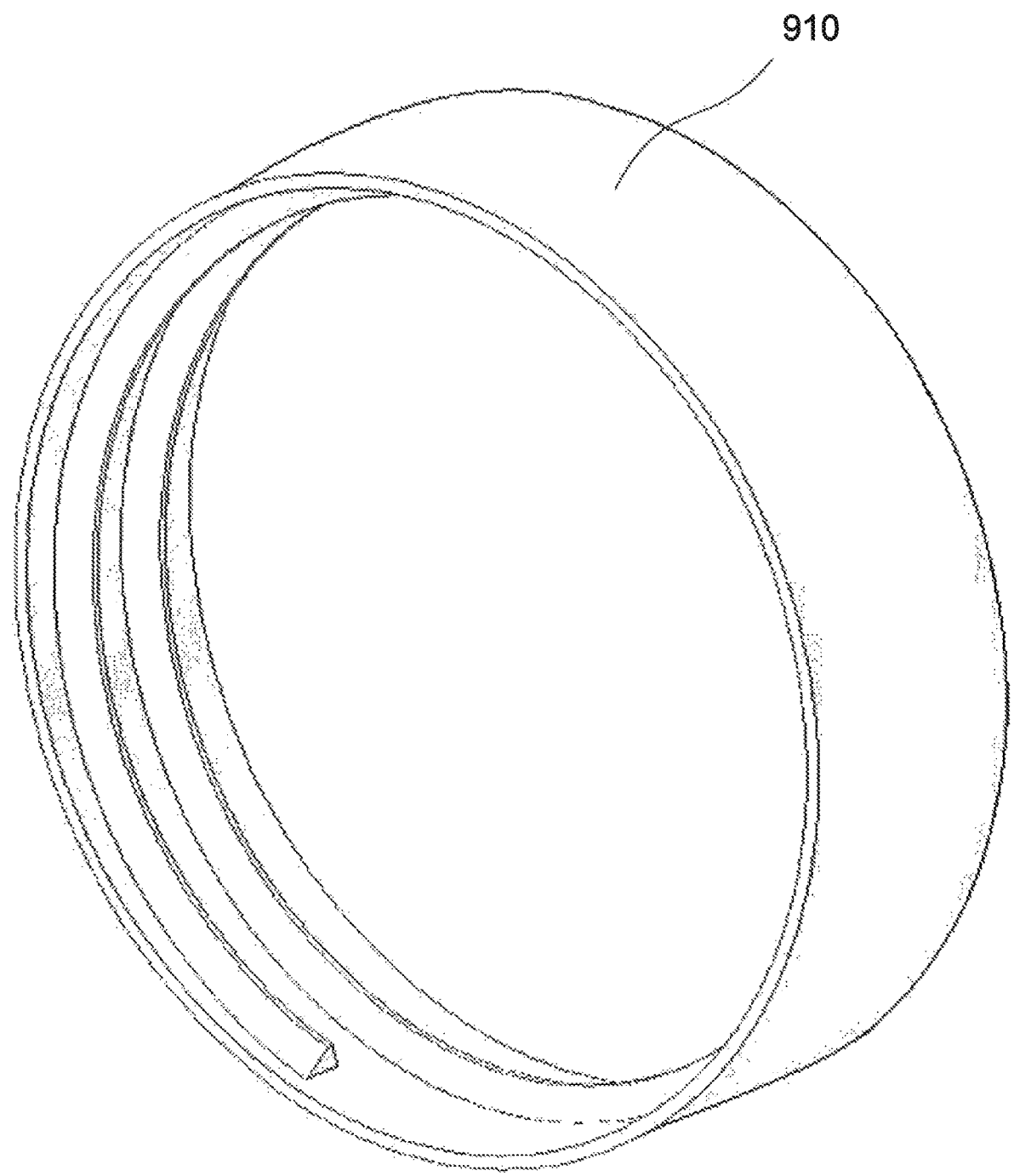
FIG. 16 is a front perspective view of a cap.

Turning now also to FIGS. 15a and 15b, in an alternative embodiment, dispersion components, including hopper 200, auger mount 300, auger 400, and spreader 500 are replaced with an alternative dispersion unit. Under this embodiment, the apparatus 100 includes drum 900. Drum 900 may comprise a hollow cylindrical container with an inner cavity 905 and defined by a circular base and an adjacent side wall. The side wall will optimally comprise a series of openings 907 sized such that essentially beneficial biological organisms 7 or materials 9 may freely pass through. Drum 900 may be mounted to an unmanned aerial vehicle UAV. Drum 900 may include a cap 910 for securing the essentially beneficial biological organisms 7 or materials 9 within the inner cavity 905 (See also FIG. 16). Cap 910 may also include a fastening means 914, such as clips or screws in order to secure cap 910 to the top of drum 900. Cap 910 may also include a motor holding area 912 which may couple with motor 38.

Figure 16A:
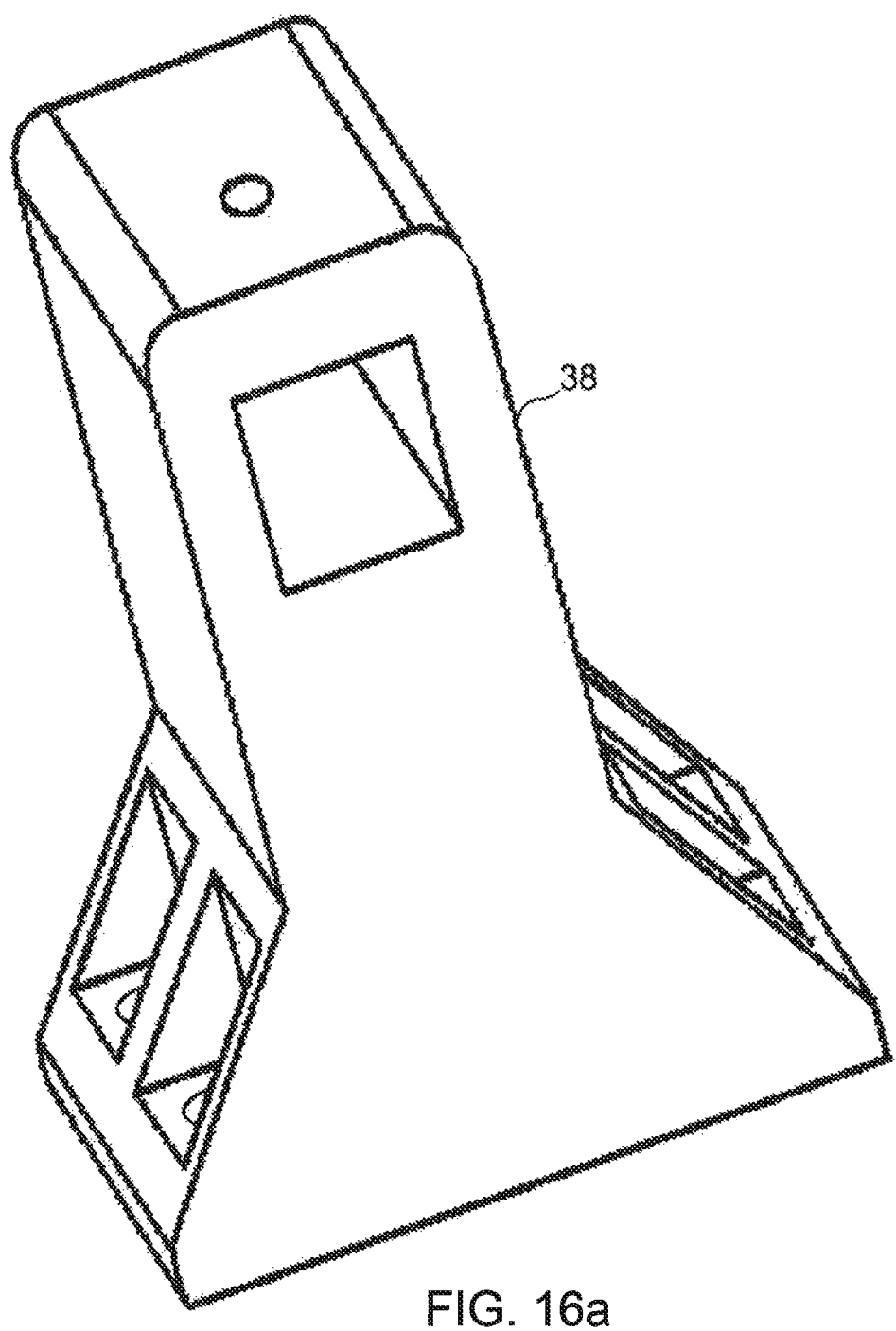
FIG. 16a is a front perspective view a motor housing mount.
Figure 16B:
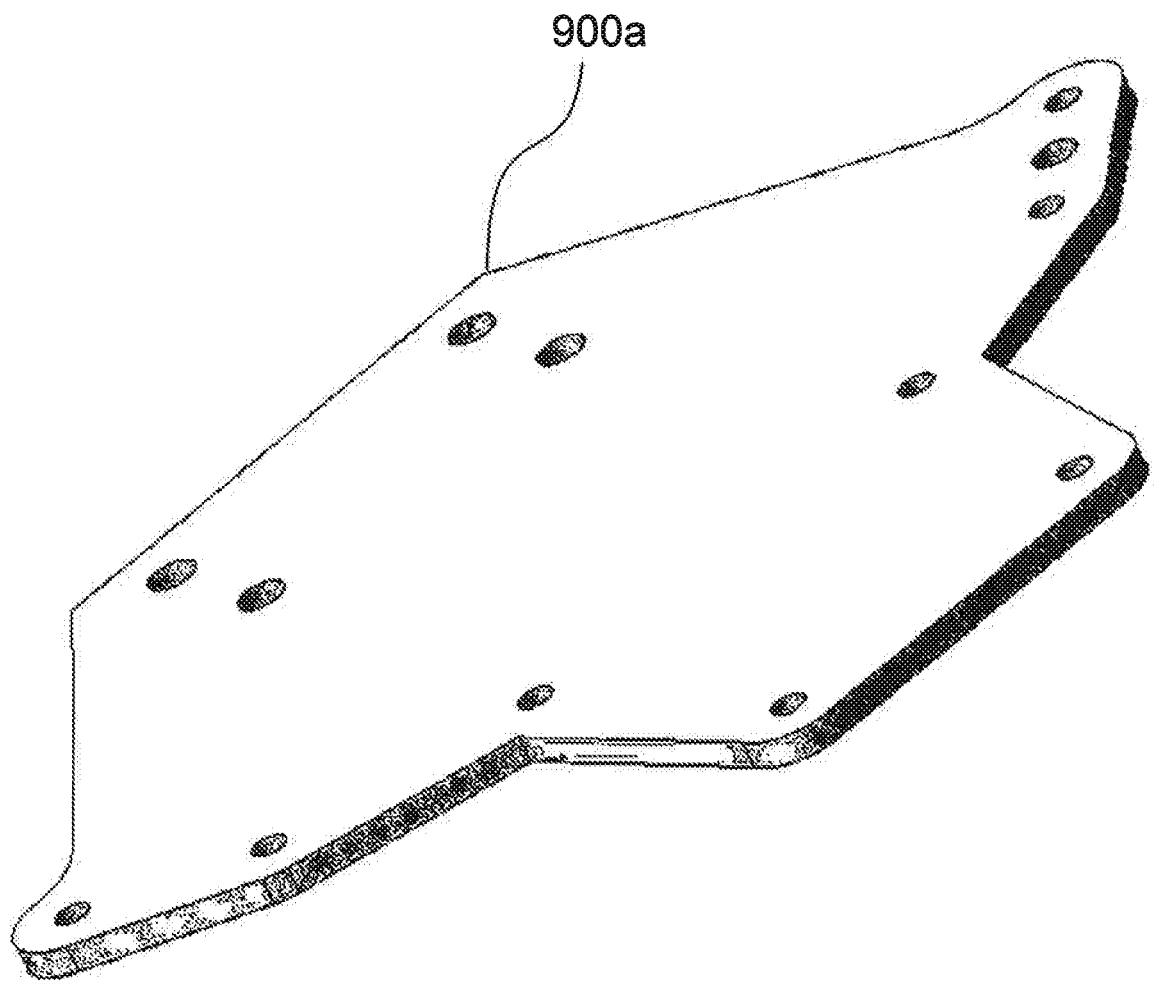
FIG. 16b is a perspective view of a drum platform.
Figure 16C:
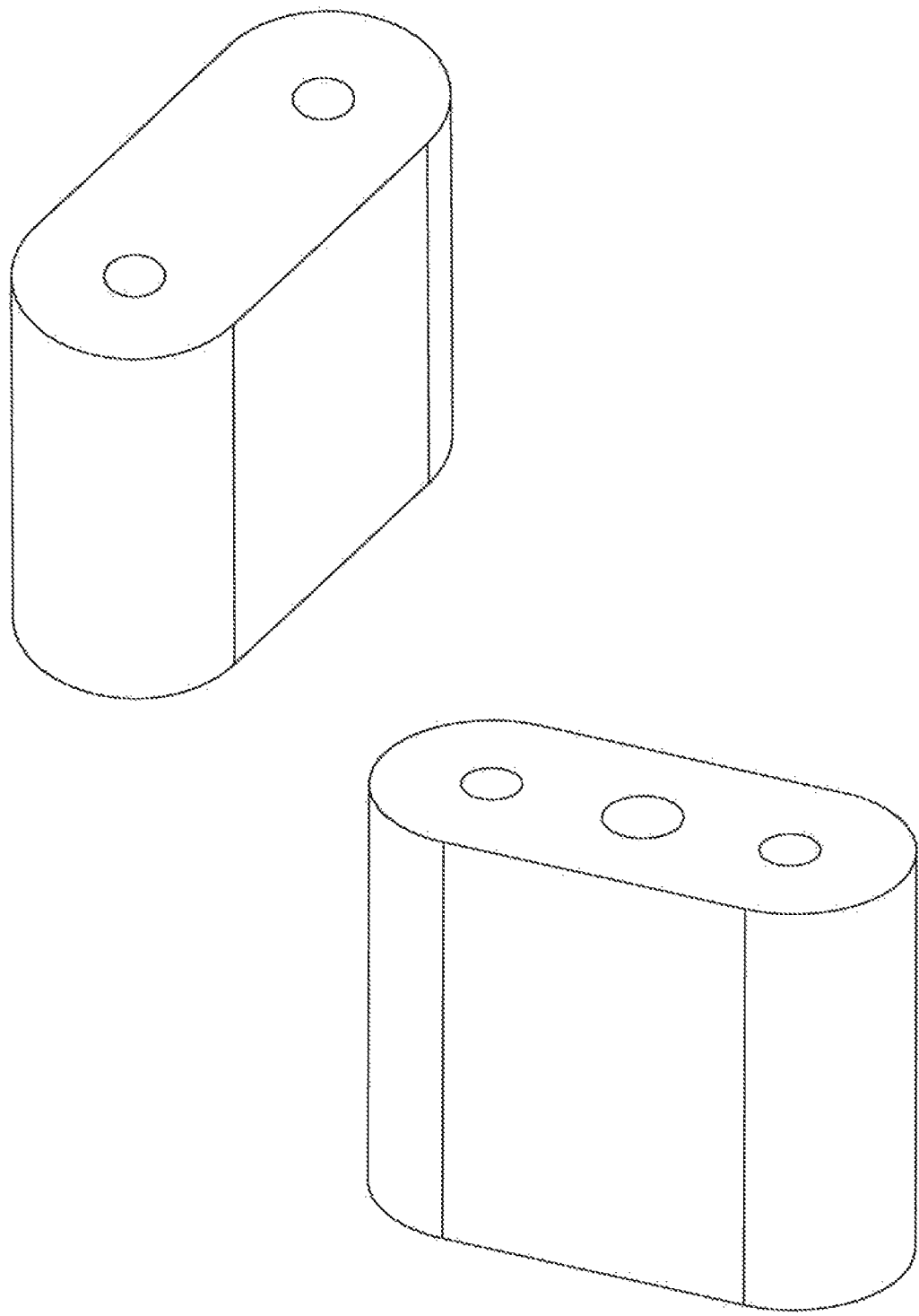
FIG. 16c is a perspective view platform mounts.

Optionally, the motor 38 can be securely fastened or mounted to a motor housing mount 38a which is securely fastened or mounted to a drum platform 900a (See FIGS. 16a-16b). In one embodiment, the drum platform 900a is advantageously coupled to a plurality of platform mounts 900b which are securely fastened to the drone or the aerial device (See FIGS. 16b-16c).

In another embodiment, drum 900 is aligned such that the central axis of the drum is substantially vertical or perpendicular to the ground. During operation, motor 38 rotates 920 drum 900. As drum 900 rotates, the centrifugal force

925 of the rotation 920 urges essentially beneficial biological organisms 7 or materials 9 radially outwards in the inner cavity 905. The centrifugal force 925 should be applied to the extent that essentially beneficial biological organisms 7 or materials 9 are urged through the series of openings 907. Porous or mesh screens 909 may be applied to openings 907 so that essentially beneficial biological organisms 7 or materials 9 will not pass through openings 909 during non-operation, but will allow the passage of essentially beneficial biological organisms 7 or materials 9 only when the centrifugal force 925 is applied.

In an alternative embodiment, cylindrical drum 900 is arranged horizontally, such that the central axis of the drum 900 is substantially parallel to the ground, as seen in FIG. 15*b*. In this embodiment, gravity will urge essentially beneficial biological organisms 7 or materials 9 to a bottom area of the side wall of the inner cavity 905. During operation, motor 38 will rotate 920 drum 900 about its central axis. As drum 900 rotates, essentially beneficial biological organisms 7 or materials 9 contained in the inner cavity 905 will continue to roll towards the bottom area of the side wall, exposing essentially beneficial biological organisms 7 or materials 9 to openings 907 as openings 907 pass by the underside of the drum 900 during rotation. As essentially beneficial biological organisms 7 or materials 9 passes over openings, essentially beneficial biological organisms 7 or materials 9 may be released from drum 900 onto the desired surfaces. On occasions, the essentially biological organisms 7 or materials 9 in the drum will arrange itself due to biological preferences. For example, some organisms will migrate to the top of the group of the essentially biological organisms 7 or materials 9 in order to get access to air or light, or in some instances naturally gravitate upwards. Accordingly, the rotation of drum 900 serves to mix the biological organisms 7 or materials 9 so that different materials are all evenly distributed for dispersion.

These embodiments have the advantage of dispersing biological organisms 7 or materials 9 through movement of the drum 900, rather than an auger in a drum or container. Granular materials such as the biological organisms 7 or materials 9, have a tendency to result in an equilibrium state where the grains are more resistant to movement, such as a jammed state. Accordingly, it is beneficial to apply a force to the granular materials to unjam them. Referring again to FIG. 15*b*, for example, as Drum 900 rotates, gravity acting on the biological organisms 7 or material 9 causes the biological organisms 7 or materials 9 to experience a tumble-like motion. This motion acts to separate grains from each other and eliminate or minimize any jammed grains.

It is envisioned that in order to minimize a worker's need to interact with the biological organisms 7 or materials 9, hopper 200 or drum 900 may be unitized and sold as cartridges pre-filled with the biological organisms 7 or materials 9. This allows for a standardized mixture of the biological organisms 7 or materials 9 to be used without individual workers needing to measure and mix organisms prior to each use. In such an embodiment, hopper 200 or drum 900, would be filled with a mixture of the biological organisms 7 and or materials 9, and the cap secured. A thin removable covering may then be applied to the exterior of the hopper 200 or drum 900 to cover the dispersing ports. Accordingly, the biological organisms 7 or materials 9 may be secure in the hopper 200 or drum 900 during transport or non-use. Once the device is to be used, the removable covering can be removed, and exposing the dispersing ports so the biological organisms 7 or materials 9 may be released to the target area.

In one embodiment of the invention, the device 100 can be used to spread predatory mites on or over strawberry fields in order to control and/or to eradicate spider mites (i.e., prey).

In an alternative embodiment of the invention, the device 100 can be used to apply and/or spread various types of other materials. These materials include, but are not limited to, the application of seeds, dry chemicals such as herbicides, pesticides, fungicides, dry fertilizers, and the application of agricultural amendments.

The term "prey" refers to mites that are present specifically as prey for the predatory mites to feed on. The predatory mites may feed on any life stage of the prey mite, for example eggs, juveniles or adults.

The term "predatory mites" refers to mites that are predators of any pest. In particular, it refers to mites that are predators of crop pests. They may be predators of pests such as insects, nematodes or arachnids. Typically, the predator mites will be useful for control of the common crop pests such as thrips, spider mites and whitefly. Most predatory mites belong to the family Phytoseiidae (order Acarina). The most common predators used for biological control are *Amblyseius swirskii, Phytoseiulus persimilis, Amblyseius californicus, Amblyseius cucumeris, Amblyseius degenerans, Hypoaspis miles, Aphidoletes aphidimyza, Aphelinus abdominalis, Aphidius colemani, Chrysoperla carnea, Aphidius ervi*, and *Diglyphus isaea*, all of which may be used in conjunction with the present invention.

*Phytoseiulus persimilis* is advantageously used in biological control programs for two-spotted spider mites (*Tetranychus urticae*), and related *Tetranychus* species. The mites are predators as nymphs and adults, mostly feeding on spider mite eggs and nymphs, but also consuming adults.

It will be preferable to choose a predator that will not cause damage to the crop plant itself. The predator mites may be used to control pests on one or more of the crop plants in the following, non-exhaustive list: tomato, sweet pepper, chilli pepper, aubergine, cucumber, beans, squash, melon, strawberry, raspberry, banana, papaya, apple, pear, plum, grape, rose, chrysanthemum, Gerbera, Begonia, Cyclamen, Corn, Poinsettia, Citrus, Skimmia, Choiysia, Daphne and Magnolia. Further, the crop can be selected from the group consisting of peppers, cucumbers, aubergines, roses, gerberas, melons and beans.

According to a further embodiment of the invention, there is provided at least one predatory mite, and at least one prey mite to act as a food source for said predatory mite.

It should be understood that the foregoing relates to various embodiments of the invention and that modifications may be made without departing from the spirit and scope of the invention. It should also be understood that the present invention is not limited to the designs mentioned in this application and the equivalent designs in this description, but it is also intended to cover other equivalents now known to those skilled in the art, or those equivalents which may become known to those skilled in the art in the future.

INDUSTRIAL APPLICABILITY

The invention pertains to an apparatus and method used to biologically control agricultural pests using biological organisms or materials, which may be of value or importance to various industries, such as the agricultural industry or producers of ornamental flowers, or even home gardeners.

What is claimed is:

1. An autonomous airborne apparatus used for biological control of agricultural pests comprising:
   a container for containing biological organisms or materials and having a dispensing port, and wherein the container is coupled to the autonomous airborne apparatus;
   said dispensing port configured to dispense the biological organisms or materials on a target location to be treated;
   an auger driven by an auger motor and having a plurality of spiral like wire brushes for urging the biological organisms or materials to the dispensing port;
   a spreader agitating device driven by a spreader motor for spreading the biological organisms or materials over the target location to be treated; and
   wherein the spreader agitating device has a substantially parabolic dish-shape that is uniform and singular, and the spreader agitating device is disposed below the dispensing port.

2. The apparatus of claim 1, wherein the apparatus is autonomously airborne through the use of an unmanned aerial vehicle.

3. The apparatus of claim 2, wherein the unmanned aerial vehicle is selected from a group consisting of: single-blade helicopter drone, multi-blade helicopter drone, and fixed wing UAV.

4. The apparatus of claim 1, wherein the biological organisms are predatory mites.

5. The apparatus of claim 1, wherein the materials are selected from the group consisting of: seeds, herbicides, pesticides, fungicides, or fertilizers.

6. The apparatus of claim 4, wherein the predatory mites belong to the Phytoseiidae family.

7. The apparatus of claim 1, wherein the biological organisms are predators selected from a group consisting of: *Amblyseius swirskii, Phytoseiulus persimilis, Amblyseius californicus, Amblyseius cucumeris, Amblyseius degenerans, Hypoaspis miles, Aphidoletes aphidimyza, Aphelinus abdominalis Aphidius colemani, Chrysoperla carnea, Aphidius ervi,* and *Diglyphus isaea.*

8. The apparatus of claim 1, wherein the spreader agitating device is coupled to a second motor, positioned below the dispensing port such that biological organisms or materials urged through the dispensing port are deflected by the spreader agitating device and dispersed over a greater area.

* * * * *